(12) United States Patent
Arimune

(10) Patent No.: US 11,518,304 B2
(45) Date of Patent: Dec. 6, 2022

(54) INDICATOR DATA OUTPUT DEVICE AND INDICATOR DATA OUTPUT METHOD

(71) Applicant: YAMAHA HATSUDOKI KABUSHIKI KAISHA, Iwata (JP)

(72) Inventor: Nobuyasu Arimune, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 107 days.

(21) Appl. No.: 17/185,808

(22) Filed: Feb. 25, 2021

(65) Prior Publication Data

US 2021/0178965 A1 Jun. 17, 2021

Related U.S. Application Data

(63) Continuation-in-part of application No. PCT/JP2019/028732, filed on Jul. 23, 2019.

(30) Foreign Application Priority Data

Aug. 31, 2018 (WO) .................. PCT/JP2018/032485

(51) Int. Cl.
*B60Q 9/00* (2006.01)
*B60K 35/00* (2006.01)
*B64D 45/00* (2006.01)

(52) U.S. Cl.
CPC .............. *B60Q 9/00* (2013.01); *B60K 35/00* (2013.01); *B60K 2370/167* (2019.05);
(Continued)

(58) Field of Classification Search
CPC .... B60Q 9/00; B60K 35/00; B60K 2370/167; B60K 2370/169; B60K 2370/171; B64D 45/00
See application file for complete search history.

(56) References Cited

U.S. PATENT DOCUMENTS

| 7,184,866 B2 * | 2/2007 | Squires ..................... B60L 3/12 701/34.3 |
| 10,803,679 B2 * | 10/2020 | Abuelsaad .............. H04W 4/44 |
| 2005/0177337 A1 * | 8/2005 | Beyer .................... G07C 5/085 702/158 |

(Continued)

FOREIGN PATENT DOCUMENTS

| CN | 106302668 A | 1/2017 |
| JP | 2006-017471 A | 1/2006 |

(Continued)

*Primary Examiner* — Chico A Foxx
(74) *Attorney, Agent, or Firm* — Rabin & Berdo, P.C.

(57) ABSTRACT

An indicator data output device, including a storage unit storing vehicle identification data and indicator data, an output unit outputting the stored indicator data, a vehicle usage amount data-obtaining unit obtaining the vehicle identification data and vehicle usage amount data, and an indicator data-updating unit obtaining the vehicle usage amount data and indicator differential data corresponding to an amount of increase in the indicator data calculated based on the vehicle usage amount data, and updating the stored indicator data. The vehicle usage amount data includes at least one of first and second indicators that increase as the vehicle is used. The second indicator indicates a number of times of a third indicator satisfying a predetermined condition, and is dimensionless with respect to all of a plurality of vehicle status dimensions. Each of the first and third indicators is a dimensional quantity with respect to at least one of the plurality of vehicle status dimensions.

26 Claims, 23 Drawing Sheets

(52) U.S. Cl.
 CPC .. *B60K 2370/169* (2019.05); *B60K 2370/171* (2019.05); *B64D 45/00* (2013.01)

(56) References Cited

U.S. PATENT DOCUMENTS

| | | | |
|---|---|---|---|
| 2010/0174443 A1* | 7/2010 | Kubota | G07C 5/006 |
| | | | 701/29.5 |
| 2011/0234391 A1 | 9/2011 | Barth et al. | |
| 2014/0188329 A1* | 7/2014 | Chen | G07C 5/008 |
| | | | 701/29.6 |
| 2017/0046669 A1* | 2/2017 | Chow | G06Q 10/0631 |
| 2017/0305369 A1* | 10/2017 | Ono | G07C 5/0825 |
| 2017/0358563 A1 | 12/2017 | Cho et al. | |
| 2018/0240080 A1* | 8/2018 | Misra | G06Q 50/30 |
| 2018/0357612 A1* | 12/2018 | Weber | G06Q 30/0633 |
| 2019/0111870 A1* | 4/2019 | Ono | G07C 5/0825 |
| 2019/0206147 A1* | 7/2019 | Abuelsaad | H04L 9/3239 |
| 2019/0392401 A1* | 12/2019 | Bellini | G06Q 10/20 |
| 2020/0013237 A1* | 1/2020 | Kanbe | G07C 5/0841 |
| 2021/0295440 A1* | 9/2021 | Hayward | G06Q 40/08 |

FOREIGN PATENT DOCUMENTS

| | | | | |
|---|---|---|---|---|
| JP | 2011118840 A | | 6/2011 | |
| JP | 2011226338 A | | 11/2011 | |
| JP | 2012-174102 A | | 9/2012 | |
| JP | 2016196829 A | | 11/2016 | |
| JP | 2017-194398 A | | 10/2017 | |
| JP | 2019-008439 A | | 1/2019 | |
| JP | 2020013374 A | * | 1/2020 | |
| WO | 2016/071993 A1 | | 5/2016 | |
| WO | WO-2016071993 A1 | * | 5/2016 | G06Q 50/10 |

* cited by examiner

Fig. 1A
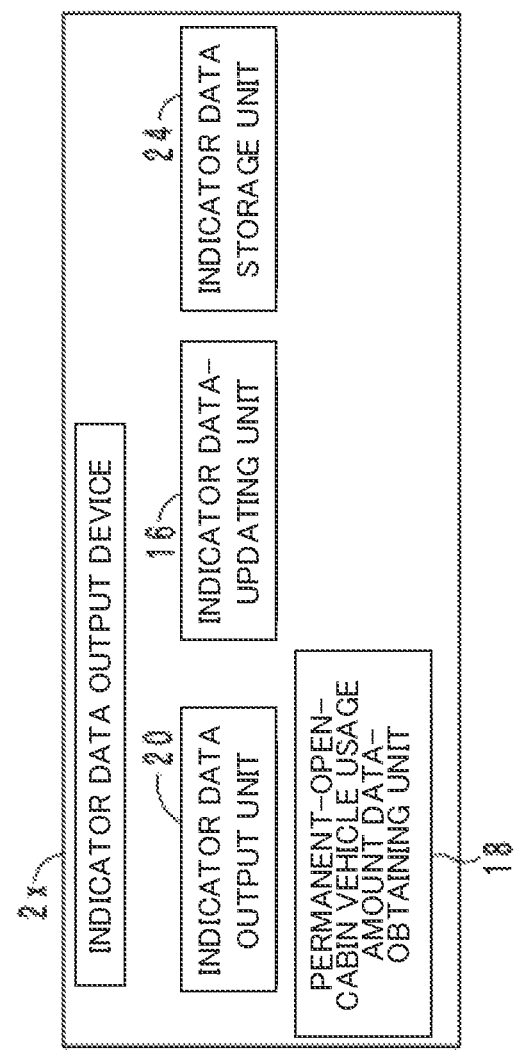
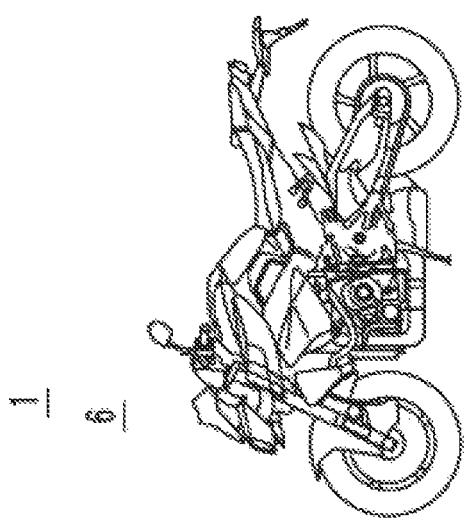

Fig.2

LATEST PERMANENT-OPEN-CABIN VEHICLE USAGE AMOUNT DATA TABLE

| LATEST PERMANENT-OPEN-CABIN VEHICLE USAGE AMOUNT DATA NUD ||||
|---|---|---|---|
| TOTAL TRAVELING DISTANCE (km) | DRIVE-SOURCE TOTAL REVOLUTION COUNT (10000 REVOLUTIONS) | DRIVE-SOURCE STARTING COUNT (TIMES) | ... |
| 12664 | 8434881 | 1060 | ... |

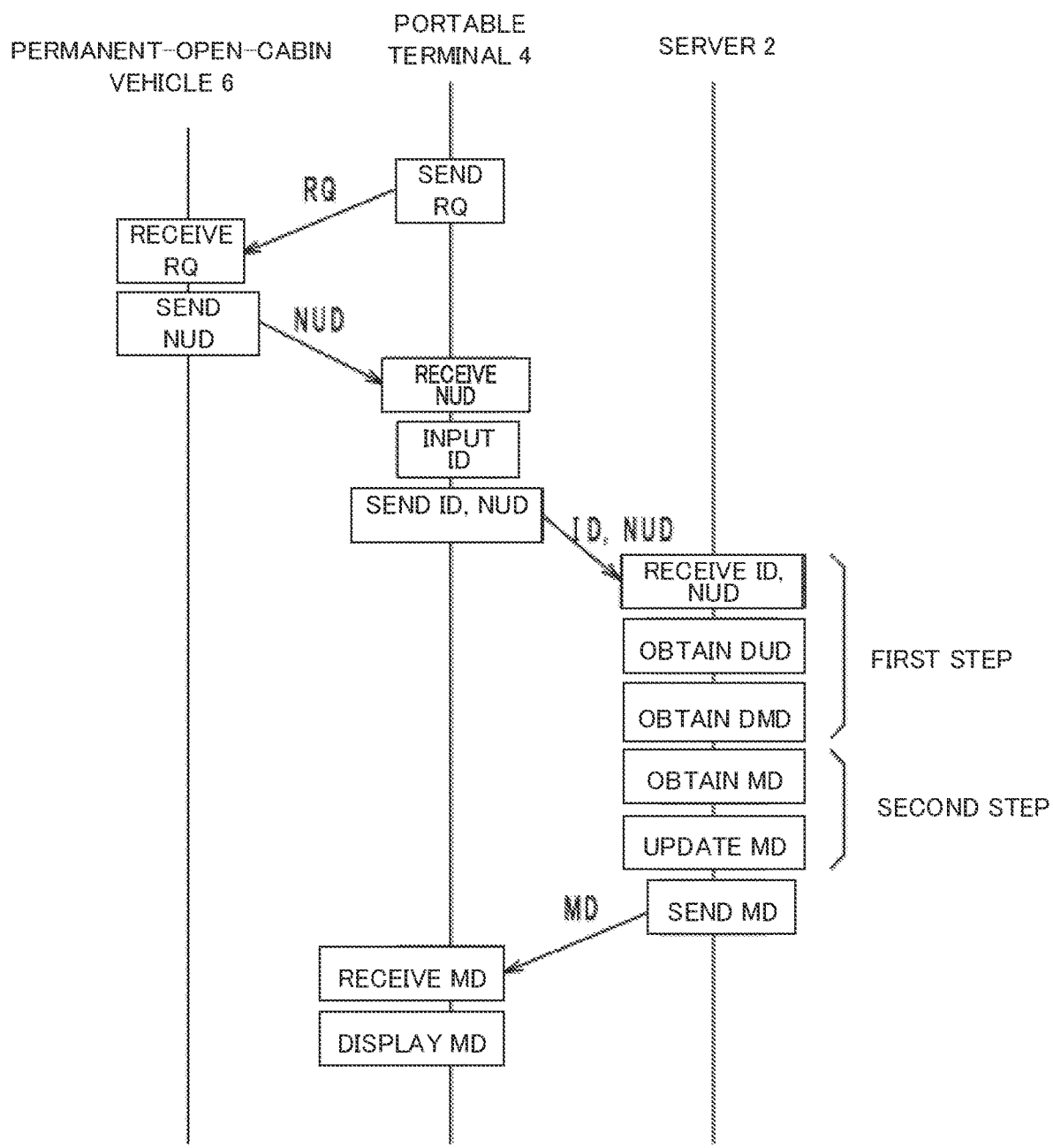

Fig.5

INDICATOR DATA TABLE

| PERMANENT-OPEN-CABIN VEHICLE IDENTIFICATION DATA ID | INDICATOR DATA MD | PERMANENT-OPEN-CABIN VEHICLE USAGE AMOUNT DATA UD | | |
|---|---|---|---|---|
| | | TOTAL TRAVELING DISTANCE (km) | DRIVE-SOURCE TOTAL REVOLUTION COUNT (1000 REVOLUTIONS) | DRIVE-SOURCE STARTING COUNT (TIMES) |
| AAA | 15236 | 12564 | 8434873 | 1056 |
| BBB | 5322 | 2003 | 5043336 | 423 |
| CCC | 10220 | 7800 | 7345133 | 1120 |
| DDD | 2003 | 565 | 358464 | 456 |
| EEE | 156 | 123 | 843543 | 20 |
| ... | ... | ... | ... | ... |

Fig.6

CONVERSION TABLE

| | PERMANENT-OPEN-CABIN VEHICLE USAGE AMOUNT DATA UD | TOTAL TRAVELING DISTANCE | DRIVE-SOURCE TOTAL REVOLUTION COUNT | DRIVE-SOURCE STARTING COUNT |
|---|---|---|---|---|
| RATE RT | | 1/km | 1/10000 REVOLUTIONS | 1/TIME |

Fig.12

PERMANENT-OPEN-CABIN VEHICLE USAGE
AMOUNT DATA TABLE

| PERMANENT-OPEN-CABIN VEHICLE USAGE AMOUNT DATA UD | | |
|---|---|---|
| TOTAL TRAVELING DISTANCE(km) | DRIVE-SOURCE TOTAL REVOLUTION COUNT (10000 REVOLUTIONS) | DRIVE-SOURCE STARTING COUNT (TIMES) |
| 12564 | 8434873 | 1056 |

Fig.13

INDICATOR DATA TABLE

| PERMANENT-OPEN-CABIN VEHICLE IDENTIFICATION DATA ID | INDICATOR DATA MD |
|---|---|
| AAA | 15236 |
| BBB | 5322 |
| CCC | 10220 |
| DDD | 2003 |
| EEE | 156 |
| ··· | ··· |

Fig.19

LATEST PERMANENT-OPEN-CABIN VEHICLE USAGE AMOUNT DATA TABLE

| PERMANENT-OPEN-CABIN VEHICLE IDENTIFICATION DATA ID | LATEST PERMANENT-OPEN-CABIN VEHICLE USAGE AMOUNT DATA NUD | | |
|---|---|---|---|
| | TOTAL TRAVELING DISTANCE(km) | DRIVE-SOURCE TOTAL REVOLUTION COUNT (10000 REVOLUTIONS) | DRIVE-SOURCE STARTING COUNT (TIMES) |
| AAA | 12664 | 8434881 | 1000 |
| *** | *** | *** | *** |

INDICATOR DATA OUTPUT DEVICE AND INDICATOR DATA OUTPUT METHOD

TECHNICAL FIELD

The present teaching relates to an indicator data output device and an indicator data output method each for notifying a user of states of a vehicle related to its usage.

BACKGROUND ART

Patent Literature 1 (hereinafter, referred to as PTL 1) has proposed a maintenance reporting device for performing notification of a maintenance timing of a vehicle and a maintenance method. The state related to usage of the vehicle includes multiple periods of time during which the vehicle is not in use (i.e., periods of time during which the vehicle is turned off). In view of this, the maintenance reporting device of PTL 1 manages, as management items, a stoppage period during which the vehicle is turned off, a usage period of a vehicle component between a usage-start time thereof and a present time, a total traveling distance of a vehicle, and an engine driving period. Based on the management items, the maintenance reporting device notifies the arrival of the maintenance timing of the vehicle and a maintenance method.

CITATION LIST

Patent Literature

PTL 1: Japanese Patent Application Laid-Open No. 2017-194398.

SUMMARY OF INVENTION

Technical Problem

Incidentally, a user sometimes wants to know an increase in usage amount of the vehicle in a simple manner, rather than the arrival of the maintenance timing of the vehicle and the maintenance method. A possible means for this is to notify the user of the increase in usage amount of the vehicle. One example of such a means is to notify the user of the management items with the maintenance reporting device of PTL 1.

However, the maintenance reporting device of PTL 1 often manages multiple management items. Thus, in order to notify the increase in usage amount of the vehicle, the maintenance reporting device of PTL 1 needs to visualize the multiple management items. In this case, the multiple management items are subjected to data processing. Consequently, the data processing load on the maintenance reporting device becomes large.

In order to deal with this, the present teaching has an objective to provide an indicator data output device and an indicator data output method each capable of enabling a user to grasp an increase in usage amount of a vehicle in a simple manner, while suppressing or reducing an increase in data processing load on the indicator data output device.

Solution to Problem

For the purpose of notifying the arrival of the maintenance timing more accurately, the number of management items dealt with by the maintenance reporting device of PTL 1 tends to increase. As the number of management items increases, the data processing load on the maintenance reporting device also tends to increase. Thus, during a process for notifying the management items to the user, the data processing load on the maintenance reporting device also tends to increase.

While focusing on a way to decrease the data processing load on the maintenance reporting device, the inventor of the present teaching surveyed a demand in techniques for performing notification of the increase in usage amount of the vehicle. As a result, the inventor found that there is a user's demand for grasping an increase in usage amount of a vehicle in a simple manner, in addition to the user's demand for knowing multiple management items.

In view of this, the inventor found that the user can grasp the increase in usage amount of the vehicle in a simple manner by indication of a simple indicator, rather than by indication of details of multiple management items. Accordingly, the user can recognize the necessity for maintenance in a simple manner, for example.

In order to solve the above-described problem, the present teaching has the following features.

An indicator data output device according to (1) includes:
(A) an indicator data storage unit;
(B) an indicator data output unit;
(C) a vehicle usage amount data-obtaining unit; and
(D) an indicator data-updating unit.

(A) The indicator data storage unit is configured to store vehicle identification data and indicator data in association with each other,
the vehicle identification data is data by which a vehicle is identifiable,
the indicator data includes a dimensionless indicator of which a dimension index is zero regarding each of a length-related dimension index, a mass-related dimension index, a time-related dimension index, an electric current-related dimension index, a thermodynamic temperature-related dimension index, a substance amount-related dimension index, or a luminosity-related dimension index, (B) the indicator data output unit is configured to output, to an outside of the indicator data output device, the indicator data stored in the indicator data storage unit, (C) the vehicle usage amount data-obtaining unit is configured to obtain the vehicle identification data and vehicle usage amount data indicating a usage amount of the vehicle identified by the vehicle identification data,
the vehicle usage amount data includes a first indicator and/or a second indicator, the first indicator of which a dimension index not being zero regarding at least one of a length-related dimension index, a mass-related dimension index, a time-related dimension index, an electric current-related dimension index, a thermodynamic temperature-related dimension index, a substance amount-related dimension index, or a luminosity-related dimension index, the second indicator indicating the number of times of which a dimension index is zero regarding each of a length-related dimension index, a mass-related dimension index, a time-related dimension index, an electric current-related dimension index, a thermodynamic temperature-related dimension index, a substance amount-related dimension index, and a luminosity-related dimension index, the first indicator and the second indicator increasing as the vehicle is used, (D) the indicator data-updating unit is configured to obtain indicator differential data of the vehicle based on the vehicle usage amount data, the vehicle usage amount data obtained by the vehicle usage amount data-obtaining unit, the vehicle identified by the vehicle identification data, the vehicle identification data obtained by the vehicle usage amount data-obtaining unit, the indicator differential data corresponds to an amount of increase in the indicator data, the amount of increase being obtained based on the vehicle usage amount data, the indicator data-updating unit is further configured to update, based on the indicator differential data, the indicator data of the vehicle identified by the vehicle identification data obtained by the vehicle usage amount data-obtaining unit, the indicator data being stored in the indicator data storage unit, and the indicator data increases as the vehicle usage amount data increases.

With the indicator data output device according to (1), it is possible to enable the user to grasp the increase in usage amount of the vehicle in a simple manner, while suppressing or reducing the increase in the data processing load on the indicator data output device. More specifically, based on the vehicle usage amount data, the indicator data-updating unit updates the indicator data. The vehicle usage amount data increases as the vehicle is used. The indicator data increases as the vehicle is used. Therefore, the user can grasp the increase in usage amount of the vehicle by checking the indicator data. In particular, the indicator data output device outputs a single piece of vehicle usage amount data. Therefore, based on the indicator data, the user can grasp the increase in usage amount of the vehicle in a simple manner. By grasping the increase in usage amount of the vehicle, the user can recognize the necessity for maintenance in a simple manner, for example.

Furthermore, the indicator data output device outputs a single piece of vehicle usage amount data. Therefore, the load applied to the indicator data output device at the time of updating and outputting of the indicator data is small. With the indicator data output device according to (1), it is possible to enable the user to grasp the increase in usage amount of the vehicle in a simple manner, while suppressing or reducing the increase in the data processing load on the indicator data output device.

An indicator data output device according to (2) is the indicator data output device according to (1) configured such that:

the vehicle usage amount data includes two or more indicators.

An indicator data output device according to (3) is the indicator data output device according to (1) or (2) configured such that:

the vehicle usage amount data includes at least one indicator indicating a total traveling distance of the vehicle, a total number of revolutions of a drive source of the vehicle, the number of times of starting the drive source of the vehicle, the number of times that a time derivative value of the number of revolutions of the drive source of the vehicle has exceeded a predetermined value, the number of times that the time derivative value of the number of revolutions of the drive source of the vehicle has fallen below the predetermined value, the number of rotations of a tire, the number of times that a time derivative value of the number of rotations of a tire has exceeded a predetermined value, the number of times that the time derivative value of the number of rotations of a tire has fallen below the predetermined value, a time integral value of the number of rotations of a tire, the number of rotations of a rotor, the number of times that a time derivative value of the number of rotations of a rotor has exceeded a predetermined value, the number of times that the time derivative value of the number of rotations of a rotor has fallen below the predetermined value, a time integral value of the number of rotations of a rotor, the number of rotations of a helix screw, the number of times that a time derivative value of the number of rotations of a helix screw has exceeded a predetermined value, the number of times that the time derivative value of the number of rotations of a helix screw has fallen below the predetermined value, a time integral value of the number of rotations of a helix screw, the number of rotations of a turbine, the number of times that a time derivative value of the number of rotations of a turbine has exceeded a predetermined value, the number of times that the time derivative value of the number of rotations of a turbine has fallen below the predetermined value, a time integral value of the number of rotations of a turbine, the number of rotations of a propeller, the number of times that a time derivative value of the number of rotations of a propeller has exceeded a predetermined value, the number of times that the time derivative value of the number of rotations of a propeller has fallen below the predetermined value, a time integral value of the number of rotations of a propeller, the number of times that a coolant temperature or an oil temperature of an engine of the vehicle has exceeded a predetermined temperature, the number of times that the coolant temperature or the oil temperature of the engine of the vehicle has fallen below the predetermined temperature, a time integral value of the coolant temperature or the oil temperature of the engine of the vehicle, a battery current, a time integral value of the battery current, the number of times that a time derivative value of the battery current has exceeded a predetermined value, the number of times that the time derivative value of the battery current has fallen below the predetermined value, a battery voltage, the number of times that a time derivative value of a value obtained by dividing the battery current by the battery voltage has exceeded a predetermined value, or the number of times that the time derivative value of the value obtained by dividing the battery current by the battery voltage has fallen below the predetermined value.

The indicator data output device according to (3) can notify the user of an increase in usage amount of the drive source (engine), the tire, the battery, or the like.

An indicator data output device according to (4) is the indicator data output device according to any one of (1) to (3) configured such that:

the indicator data storage unit stores the vehicle identification data, the indicator data, and the vehicle usage amount data in association with each other, the vehicle usage amount data-obtaining unit obtains, as the vehicle usage amount data, latest vehicle usage amount data, which corresponds to vehicle usage amount data most recently obtained, the indicator data-updating unit is further configured to calculate vehicle usage amount differential data by subtracting the vehicle usage amount data stored in the indicator data storage unit from the latest vehicle usage amount data obtained by the vehicle usage amount data-obtaining unit, and the indicator data-updating unit obtains the indicator differential data based on the vehicle usage amount differential data.

An indicator data output device according to (5) is the indicator data output device according to (4) configured such that:

the vehicle usage amount data stored in the indicator data storage unit is vehicle usage amount data upon a most recent maintenance of the vehicle.

With the indicator data output device according to (5), the vehicle usage amount data is updated when maintenance is performed on the vehicle. That is, as the maintenance is performed on the vehicle, the indicator data is also updated. For example, in a case where the indicator data is an indicator exchangeable with a service related to maintenance of the vehicle or an indicator exchangeable with a service that is not maintenance of the vehicle, the above configuration can promote the user to go to a shop engaged in maintenance on the vehicle in order to update the indicator data.

An indicator data output device according to (6) is the indicator data output device according to (5) configured such that:

in a case where the vehicle usage amount differential data is higher than a vehicle usage amount differential data upper limit value, the indicator data-updating unit updates the vehicle usage amount differential data as the vehicle usage amount differential data upper limit value.

The indicator data output device according to (6) can make the user go to the shop engaged in maintenance of the vehicle in order to update the indicator data, before the vehicle usage amount differential data reaches the vehicle usage amount differential data upper limit value.

An indicator data output device according to (7) is the indicator data output device according to any one of (1) to (4) configured such that:

the indicator data stored in the indicator data storage unit is indicator data upon a most recent maintenance of the vehicle.

With the indicator data output device according to (7), the indicator data is updated when maintenance is performed on the vehicle. For example, in a case where the indicator data is an indicator exchangeable with a service related to maintenance of the vehicle or an indicator exchangeable with a service that is not maintenance of the vehicle, the above configuration can promote the user to go to the shop engaged in maintenance of the vehicle in order to update the indicator data.

An indicator data output device according to (8) is the indicator data output device according to (7) configured such that:

in a case where the indicator differential data is higher than an indicator differential data upper limit value, the indicator data-updating unit updates the indicator differential data as the indicator differential data upper limit value.

The indicator data output device according to (8) can make the user go to the shop engaged in maintenance of the vehicle in order to update the indicator data, before the indicator differential data reaches the indicator differential data upper limit value.

An indicator data output device according to (9) is the indicator data output device according to any one of (4) to (6) configured such that:

the indicator data-updating unit obtains the vehicle usage amount differential data that increases over a vehicle usage amount differential data effective period.

An indicator data output device according to (10) is the indicator data output device according to any one of (1) to (4) configured such that:

the indicator data-updating unit obtains the indicator differential data that increases over an indicator differential data effective period.

An indicator data output device according to (11) is the indicator data output device according to any one of (1) to (10) configured such that:

the indicator data-updating unit updates the indicator data stored in the indicator data storage unit, at a timing when a user of the vehicle comes to a shop engaged in maintenance of the vehicle.

The indicator data output device according to (11) can make the user go to the shop engaged in maintenance of the vehicle in order to update the indicator data.

An indicator data output device according to (12) is the indicator data output device according to any one of (1) to (11) configured such that:

the indicator data-updating unit is further configured to devalue the indicator data when an indicator data effective period has elapsed after updating of the indicator data.

An indicator data output device according to (13) is the indicator data output device according to any one of (1) to (12) configured such that:

the vehicle usage amount data-obtaining unit obtains, by radio communication, the vehicle identification data and the vehicle usage amount data indicating the usage amount of the vehicle, the vehicle identified by the vehicle identification data.

An indicator data output method according to (14) is to be executed by an indicator data output device including (a) an indicator data storage unit, said method comprising:

(b) a vehicle usage amount data-obtaining step;
(c) an indicator data-updating step; and
(d) an indicator data output step, wherein (a) the indicator data storage unit is configured to store vehicle identification data and indicator data in association with each other, the vehicle identification data is data by which a vehicle is identifiable, the indicator data includes a dimensionless indicator of which a dimension index is zero regarding each of a length-related dimension index, a mass-related dimension index, a time-related dimension index, an electric current-related dimension index, a thermodynamic temperature-related dimension index, a substance amount-related dimension index, or a luminosity-related dimension index, (b) in the vehicle usage amount data-obtaining step, the vehicle identification data and vehicle usage amount data indicating a usage amount of the vehicle identified by the vehicle identification data are obtained, the vehicle usage amount data includes a first indicator and/or a second indicator, the first indicator of which a dimension index not being zero regarding at least one of a length-related dimension index, a mass-related dimension index, a time-related dimension index, an electric current-related dimension index, a thermodynamic temperature-related dimension index, a substance amount-related dimension index, or a luminosity-related dimension index, the second indicator indicating the number of times of which a dimension index is zero regarding each of a length-related dimension index, a mass-related dimension index, a time-related dimension index, an electric current-related dimension index, a thermodynamic temperature-related dimension index, a substance amount-related dimension index, and a luminosity-related dimension index, the first indicator and the second indicator increasing as the vehicle is used, (c) in the indicator data-updating step, indicator differential data of the vehicle is obtained based on the vehicle usage amount data, the vehicle usage amount data obtained in the vehicle usage amount data-obtaining step, the vehicle identified by the vehicle identification data, the vehicle identification data obtained in the vehicle usage amount data-obtaining step, the indicator differential data corresponds to an amount of increase in the indicator data, the amount of increase being obtained based on the vehicle usage amount data, in the indicator data-updating step, the indicator data of the vehicle is updated based on the indicator differential data, the vehicle identified by the vehicle identification data, the vehicle identification data obtained in the vehicle usage amount data-obtaining step, the indicator data being stored in the indicator data storage unit, the indicator data increases as the vehicle usage amount data increases, and (d) in the indicator data output step, the indicator data stored in the indicator data storage unit is outputted to an outside of the indicator data output device.

With the indicator data output method according to (14), it is possible to enable a user to grasp the increase in usage amount of the vehicle in a simple manner, while suppressing or reducing the increase in the data processing load on the indicator data output device. More specifically, based on the vehicle usage amount data, in the indicator data-updating step, the indicator data is updated. The vehicle usage amount data increases as the vehicle is used. The indicator data increases as the vehicle is used. Therefore, the user can grasp the increase in usage amount of the vehicle by checking the indicator data. Particularly, with the indicator data output method, a single piece of vehicle usage amount data is outputted. Therefore, the user can grasp the increase in usage amount of the vehicle based on the indicator data in a simple manner. The user can recognize the necessity for maintenance in a simple manner by grasping the increase in usage amount of the vehicle, for example.

Furthermore, with the indicator data output method, a single piece of vehicle usage amount data is outputted. Therefore, the load applied to the indicator data output device at the time of updating and outputting of the indicator data is small. Thus, with the indicator data output method according to (14), it is possible to enable the user to grasp the increase in usage amount of the vehicle in a simple manner, while suppressing or reducing the increase in the data processing load on the indicator data output device.

An indicator data output method according to (15) is the indicator data output method according to (14) configured such that:

the vehicle usage amount data includes two or more indicators.

An indicator data output method according to (16) is the indicator data output method according to (14) or (15) configured such that:

the vehicle usage amount data includes at least one indicator indicating a total traveling distance of the vehicle, a total number of revolutions of a drive source of the vehicle, the number of times of starting the drive source of the vehicle, the number of times that a time derivative value of the number of revolutions of the drive source of the vehicle has exceeded a predetermined value, the number of times that the time derivative value of the number of revolutions of the drive source of the vehicle has fallen below the predetermined value, the number of rotations of a tire, the number of times that a time derivative value of the number of rotations of a tire has exceeded a predetermined value, the number of times that the time derivative value of the number of rotations of a tire has fallen below the predetermined value, a time integral value of the number of rotations of a tire, the number of rotations of a rotor, the number of times that a time derivative value of the number of rotations of a rotor has exceeded a predetermined value, the number of times that the time derivative value of the number of rotations of a rotor has fallen below the predetermined value, a time integral value of the number of rotations of a rotor, the number of rotations of a helix screw, the number of times that a time derivative value of the number of rotations of a helix screw has exceeded a predetermined value, the number of times that the time derivative value of the number of rotations of a helix screw has fallen below the predetermined value, a time integral value of the number of rotations of a helix screw, the number of rotations of a turbine, the number of times that a time derivative value of the number of rotations of a turbine has exceeded a predetermined value, the number of times that the time derivative value of the number of rotations of a turbine has fallen below the predetermined value, a time integral value of the number of rotations of a turbine, the number of rotations of a propeller, the number of times that a time derivative value of the number of rotations of a propeller has exceeded a predetermined value, the number of times that the time derivative value of the number of rotations of a propeller has fallen below the predetermined value, a time integral value of the number of rotations of a propeller, the number of times that a coolant temperature or an oil temperature of an engine of the vehicle has exceeded a predetermined temperature, the number of times that the coolant temperature or the oil temperature of the engine of the vehicle has fallen below the predetermined temperature, a time integral value of the coolant temperature or the oil temperature of the engine of the vehicle, a battery current, a time integral value of the battery current, the number of times that a time derivative value of the battery current has exceeded a predetermined value, the number of times that the time derivative value of the battery current has fallen below the predetermined value, a battery voltage, the number of times that a time derivative value of a value obtained by dividing the battery current by the battery voltage has exceeded a predetermined value, or the number of times that the time derivative value of the value obtained by dividing the battery current by the battery voltage has fallen below the predetermined value.

The indicator data output method according to (16) can notify the user of an increase in usage amount of the drive source (engine), the tire, the battery, or the like.

An indicator data output method according to (17) is the indicator data output method according to any one of (14) to (16) configured such that:

the indicator data storage unit stores the vehicle identification data, the indicator data, and the vehicle usage amount data in association with each other, in the vehicle usage amount data-obtaining step, latest vehicle usage amount data is obtained as the vehicle usage amount data, the latest vehicle usage amount data corresponding to vehicle usage amount data most recently obtained, in the indicator data-updating step, vehicle usage amount differential data is calculated by subtracting the vehicle usage amount data stored in the indicator data storage unit from the latest vehicle usage amount data obtained in the vehicle usage amount data-obtaining step, and in the indicator data-updating step, the indicator differential data is obtained based on the vehicle usage amount differential data.

An indicator data output method according to (18) is the indicator data output method according to (17) configured such that:

the vehicle usage amount data stored in the indicator data storage unit is vehicle usage amount data upon a most recent maintenance of the vehicle.

With the indicator data output method according to (18), the vehicle usage amount data is updated when maintenance is performed on the vehicle. That is, as the maintenance is performed on the vehicle, the indicator data is also updated. For example, in a case where the indicator data is an indicator exchangeable with a service related to maintenance of the vehicle or an indicator exchangeable with a service that is not maintenance of the vehicle, the above configuration can promote the user to go to a shop engaged in maintenance of the vehicle to update the indicator data.

An indicator data output method according to (19) is the indicator data output method according to (18) configured such that:

in a case where the vehicle usage amount differential data is higher than a vehicle usage amount differential data upper limit value, the vehicle usage amount differential data is updated as the vehicle usage amount differential data upper limit value in the indicator data-updating step.

The indicator data output method according to (19) can make the user go to the shop engaged in maintenance of the vehicle in order to update the indicator data, before the vehicle usage amount differential data reaches the vehicle usage amount differential data upper limit value.

An indicator data output method according to (20) is the indicator data output method according to any one of (14) to (17) configured such that:

the indicator data stored in the indicator data storage unit is indicator data upon a most recent maintenance of the vehicle.

With the indicator data output method according to (20), the indicator data is updated when maintenance is performed on the vehicle. For example, in a case where the indicator data is an indicator exchangeable with a service related to maintenance of the vehicle or an indicator exchangeable with a service that is not maintenance of the vehicle, the above configuration can promote the user to go to the shop engaged in maintenance of the vehicle in order to update the indicator data.

An indicator data output method according to (21) is the indicator data output method according to (20) configured such that:

in a case where the indicator differential data is higher than an indicator differential data upper limit value, the indicator differential data is updated as the indicator differential data upper limit value in the indicator data-updating step.

The indicator data output method according to (21) can make the user go to the shop engaged in maintenance of the vehicle in order to update the indicator data, before the indicator differential data reaches the indicator differential data upper limit value.

An indicator data output method according to (22) is the indicator data output method according to any one of (17) to (19) configured such that:

the vehicle usage amount differential data is obtained in the indicator data-updating step, the vehicle usage amount differential data that increasing over a vehicle usage amount differential data effective period.

An indicator data output method according to (23) is the indicator data output method according to any one of (14) to (17) configured such that:

the indicator differential data is obtained in the indicator data-updating step, the indicator differential data increasing over an indicator differential data effective period.

An indicator data output method according to (24) is the indicator data output method according to any one of (14) to (23) configured such that:

in the indicator data-updating step, the indicator data stored in the indicator data storage unit is updated, at a timing when a user of the vehicle comes to a shop engaged in maintenance of the vehicle.

The indicator data output method according to (24) can make the user go to the shop engaged in maintenance of the vehicle in order to update the indicator data.

An indicator data output method according to (25) is the indicator data output method according to any one of (14) to (24) configured such that:

in the indicator data-updating step, the indicator data is devalued when an indicator data effective period has elapsed after updating of the indicator data.

An indicator data output method according to (26) is the indicator data output method according to any one of (14) to (25) configured such that:

in the vehicle usage amount data-obtaining step, the vehicle identification data and the vehicle usage amount data are obtained by radio communication, the vehicle usage amount data indicating the usage amount of the vehicle, the vehicle identified by the vehicle identification data.

The above-described object and other objects, features, aspects, and advantages of the present teaching will be further clarified from detailed descriptions of embodiments of the present teaching that will be given below based on the accompanying drawings.

As used herein, the term "and/or" includes any and all combinations of one or more of the associated listed items.

As used herein, the terms "including", "comprising", or "having", and variations thereof specify the presence of stated features, steps, operations, elements, components, and/or equivalents thereof, and can include one or more of steps, operations, elements, components, and/or their groups.

Unless otherwise defined, all terms (including technical and scientific terms) used herein have the same meaning as commonly understood by one of ordinary skilled in the art to which the present teaching belongs.

It will be further understood that terms, such as those defined in commonly used dictionaries, should be interpreted as having a meaning that is consistent with their meaning in the context of the present teaching and relevant art and should not be interpreted in an idealized or overly formal sense unless expressly so defined herein.

It will be understood that the description of the present teaching discloses the number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Advantageous Effects of Invention

According to the present teaching, it is possible to notify a user of a state related to maintenance before notification of the arrival of a maintenance timing, while suppressing or reducing an increase in data processing load on the indicator data output device.

BRIEF DESCRIPTION OF DRAWINGS

FIG. 1A is a block diagram of an overall configuration of an indicator data output system 1.

FIG. 2 shows a latest permanent-open-cabin vehicle usage amount data table stored in a storage unit 44.

FIG. 3B is a sequence diagram of data communication in the indicator data output system 1a.

FIG. 5 shows an indicator data table stored in an indicator data storage unit 24.

FIG. 6 shows a conversion table stored in a conversion table storage unit 26.

FIG. 12 shows a permanent-open-cabin vehicle usage amount data table stored in a storage unit 34.

FIG. 13 shows an indicator data table stored in an indicator data storage unit 24.

FIG. 19 shows a latest permanent-open-cabin vehicle usage amount data table.

DESCRIPTION OF EMBODIMENTS (Outline)

Figure 1B:
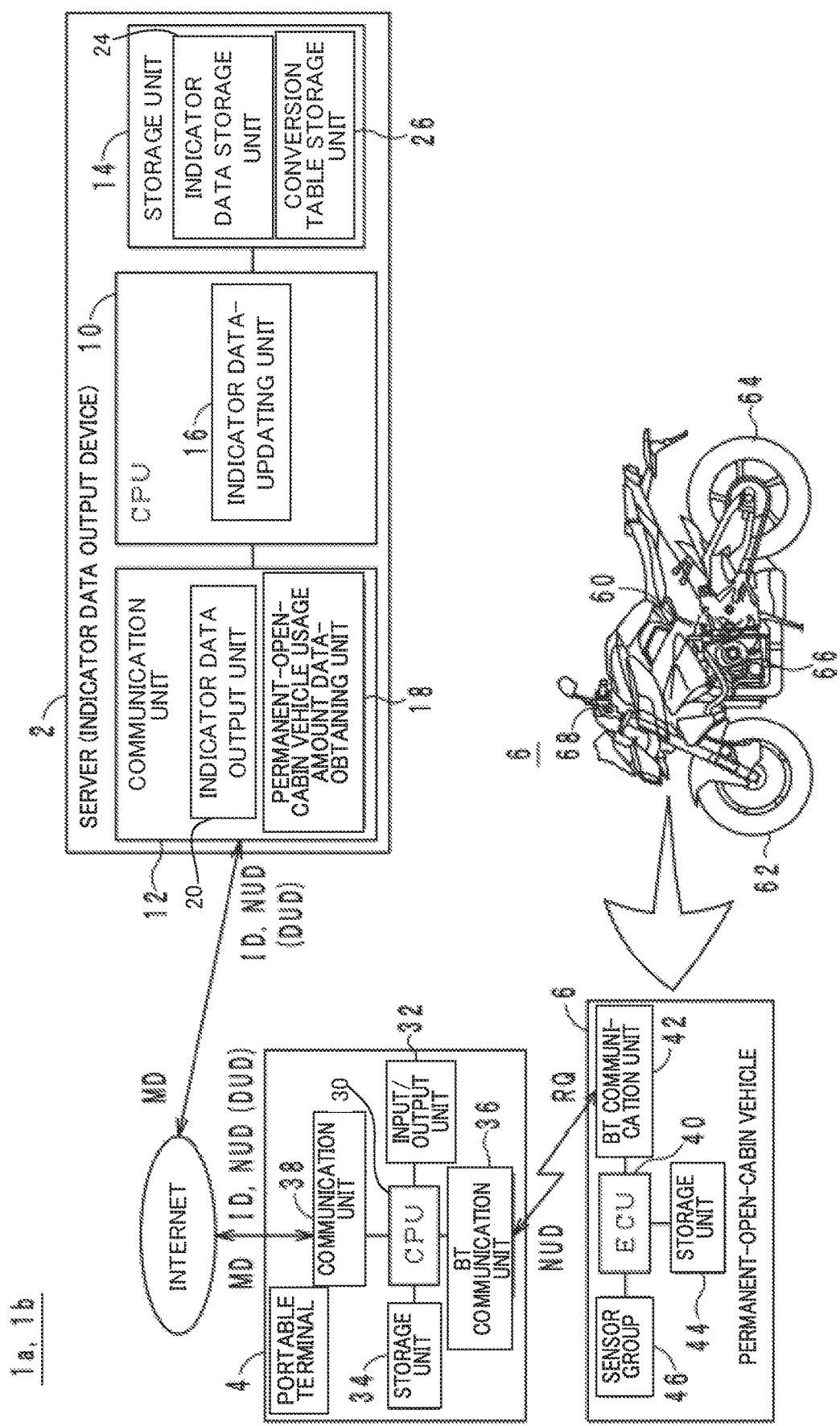
FIG. 1B is a block diagram of an overall configuration of the indicator data output system 1a, 1b.

The following will describe an outline of an indicator data output device and an indicator data output method. The indicator data output method is a method that is to be executed by the indicator data output device.

With reference to the drawings, the following will describe an overall configuration of an indicator data output system 1. FIG. 1A is a block diagram of an overall configuration of the indicator data output system 1.

As shown in FIG. 1A, the indicator data output system 1 includes an indicator data output device 2x. The indicator data output device 2x notifies, to a user of a permanent-open-cabin vehicle 6 (one example of a vehicle), a state related to usage of the permanent-open-cabin vehicle 6.

The permanent-open-cabin vehicle 6 is a vehicle without a roof fixedly provided for a driver's seat. Thus, the permanent-open-cabin vehicle 6 does not encompass a vehicle with a roof undetachably provided for a driver's seat. The roof is a member covering an upper side, a front side, a rear side, a left side, and a right side of the driver's seat. That is, the roof includes a front window, a rear window, and side windows, for example. Accordingly, the roof does not encompass a member covering only the upper side of the driver's seat and not covering the front side, the rear side, the left side, or the right side of the driver's seat, for example. In addition, the roof does not encompass a member covering the upper side of the driver's seat and not covering at least one of the front side, the rear side, the left side, or the right side of the driver's seat, for example. Thus, the permanent-open-cabin vehicle 6 may include the member covering only the upper side of the driver's seat and not covering the front side, the rear side, the left side, or the right side of the driver's seat. Alternatively, the permanent-open-cabin vehicle 6 may include the member covering the upper side of the driver's seat and not covering at least one of the front side, the rear side, the left side, or the right side of the driver's seat. The permanent-open-cabin vehicle 6 does not encompass a vehicle that cannot be used with its roof detached from a driver's seat. That is, the permanent-open-cabin vehicle 6 does not encompass a vehicle that is not designed on the assumption of use in a state where a roof is detached from a driver's seat.

The permanent-open-cabin vehicle 6 may be any vehicle, as long as it satisfies the above-described conditions. Examples of the permanent-open-cabin vehicle 6 encompass a two-wheeled motor vehicle, a three-wheeled motor vehicle, a trike, an all-terrain vehicle (ATV), a recreational off-highway vehicle (ROV), a boat, a sailing yacht, a motor yacht, a watercraft, a snowmobile, a power assisted bicycle, a bicycle, a golf cart, a land car, a racing cart, a go-cart, a mower, a snowplow, a cultivator, a rice reaping machine, a helicopter, and a light aircraft, etc. As described above, the permanent-open-cabin vehicle 6 encompasses not only a vehicle driven only by power generated by a drive source but also a vehicle driven by power generated by a drive source and human power, a vehicle driven by power generated by a drive source and wind power, a vehicle driven only by human power, and a vehicle driven only by wind power. The three-wheeled motor vehicle encompasses a three-wheeled motor vehicle whose vehicle body frame leans to the left or right while the vehicle is making a turn to the left or right and a three-wheeled motor vehicle whose vehicle body frame does not lean to the left or right while the vehicle is making a turn to the left or right. The permanent-open-cabin vehicle 6 does not encompass a four-wheeled motor vehicle (a standard-sized automobile, a light automobile) permitted to drive on a public road. The four-wheeled motor vehicle also encompasses a vehicle with four or more wheels. In the present embodiment, the permanent-open-cabin vehicle 6 is a two-wheeled motor vehicle.

The permanent-open-cabin vehicle 6 is replaceable with a vehicle. The vehicle is a concept encompassing the permanent-open-cabin vehicle 6. The vehicle also encompasses the four-wheeled motor vehicle permitted to drive on a public road. The vehicle further encompasses a vehicle with a roof undetachably provided for a driver's seat. Thus, the vehicle encompasses an aircraft with a roof, a ship with a roof, and a helicopter with a roof. The vehicle may drive autonomously or may be remote-operated.

The vehicle may not have a cabin in which a driver and/or a passenger can ride. Such a type of vehicle may be an autonomous-driving work vehicle or a remote-operated work vehicle, for example. The autonomous-driving work vehicle is a vehicle designed to drive autonomously to perform an agricultural work, a construction work, a civil engineering work, and/or the like. The remote-operated work vehicle is a vehicle designed to be remote-operated to perform an agricultural work, a construction work, a civil engineering work, and/or the like.

In a case where a helicopter is employed as the vehicle, the drive source may be an engine or a motor. In this case, the drive source of the helicopter rotates a rotor. In a case where a ship is employed as the vehicle, the drive source may be an engine, a motor, or a pump-jet. In this case, the engine or motor serving as the drive source of the ship rotates a helix screw. In a case where an aircraft is employed as the vehicle, the drive source may be an engine (including a jet engine) or a motor. In this case, the jet engine serving as the drive source of the aircraft rotates a turbine. The engine or motor serving as the drive source of the aircraft rotates a propeller.

The indicator data output device 2x may be a server, for example. Alternatively, the indicator data output device 2x may be a portable terminal, such as a smartphone or a tablet terminal. The indicator data output device 2x may be a part of on-board equipment mounted on the permanent-open-cabin vehicle 6 or a part of the permanent-open-cabin vehicle 6. The indicator data output device 2x includes an indicator data-updating unit 16, a permanent-open-cabin vehicle usage amount data-obtaining unit 18, an indicator data output unit 20, and an indicator data storage unit 24.

The indicator data storage unit 24 is configured to store permanent-open-cabin vehicle identification data and indicator data in association with each other. The permanent-open-cabin vehicle identification data is data by which the permanent-open-cabin vehicle 6 is identifiable. The indicator data includes a dimensionless indicator of which a dimension index is zero regarding each of a length-related dimension index, a mass-related dimension index, a time-related dimension index, an electric current-related dimension index, a thermodynamic temperature-related dimension index, a substance amount-related dimension index, or a luminosity-related dimension index. The permanent-open-cabin vehicle identification data may be identification (ID) assigned to the permanent-open-cabin vehicle 6, for example. Alternatively, the permanent-open-cabin vehicle identification data may be a character string given by the indicator data output device 2x when a user registers the permanent-open-cabin vehicle 6 in the indicator data output device 2x. Further alternatively, the permanent-open-cabin vehicle identification data may be a character string determined by the user when the user registers the permanent-open-cabin vehicle 6 in the indicator data output device 2x.

The indicator data output unit 20 is configured to output, to the outside of the indicator data output device 2x, the indicator data stored in the indicator data storage unit 24. The indicator data output unit 20 may output the indicator data to the outside of the indicator data output device 2x by displaying the indicator data. Alternatively, the indicator data output unit 20 may output the indicator data to the outside of the indicator data output device 2x by outputting the content of the indicator data by sound. Further alternatively, the indicator data output unit 20 may output the indicator data to the outside of the indicator data output device 2x by radio communication. Still further alternatively, the indicator data output unit 20 may output the indicator data to the outside of the indicator data output device 2x by wired communication.

The permanent-open-cabin vehicle usage amount data-obtaining unit 18 is configured to obtain the permanent-open-cabin vehicle identification data and permanent-open-cabin vehicle usage amount data indicating a usage amount of the permanent-open-cabin vehicle 6 identified by the permanent-open-cabin vehicle identification data. The permanent-open-cabin vehicle usage amount data-obtaining unit 18 may obtain the permanent-open-cabin vehicle identification data and the permanent-open-cabin vehicle usage amount data by radio communication. Alternatively, the permanent-open-cabin vehicle usage amount data-obtaining unit 18 may obtain the permanent-open-cabin vehicle identification data and the permanent-open-cabin vehicle usage amount data by wired communication. Further alternatively, the permanent-open-cabin vehicle usage amount data-obtaining unit 18 may obtain the permanent-open-cabin vehicle identification data and the permanent-open-cabin vehicle usage amount data in response to a user's action of inputting information through an input means (not shown).

The permanent-open-cabin vehicle usage amount data includes a first indicator and/or a second indicator, the first indicator of which a dimension index not being zero, regarding at least one of a length-related dimension index, a mass-related dimension index, a time-related dimension index, an electric current-related dimension index, a thermodynamic temperature-related dimension index, a substance amount-related dimension index, or a luminosity-related dimension index, the second indicator indicating the number of times of which a dimension index is zero regarding each of a length-related dimension index, a mass-related dimension index, a time-related dimension index, an electric current-related dimension index, a thermodynamic temperature-related dimension index, a substance amount-related dimension index, and a luminosity-related dimension index, the first indicator and the second indicator increasing as the permanent-open-cabin vehicle 6 is used. For example, the permanent-open-cabin vehicle usage amount data includes at least one indicator indicating a total traveling distance of the permanent-open-cabin vehicle 6, a total number of revolutions of the drive source of the permanent-open-cabin vehicle 6, the number of times of starting the drive source of the permanent-open-cabin vehicle 6, the number of times that a time derivative value of the number of revolutions of the drive source of the permanent-open-cabin vehicle 6 has exceeded a predetermined value, the number of times that the time derivative value of the number of revolutions of the drive source of the permanent-open-cabin vehicle 6 has fallen below the predetermined value, the number of rotations of a tire, the number of times that a time derivative value of the number of rotations of a tire has exceeded a predetermined value, the number of times that the time derivative value of the number of rotations of a tire has fallen below the predetermined value, a time integral value of the number of rotations of a tire, the number of rotations of a rotor, the number of times that a time derivative value of the number of rotations of a rotor has exceeded a predetermined value, the number of times that the time derivative value of the number of rotations of a rotor has fallen below the predetermined value, a time integral value of the number of rotations of a rotor, the number of rotations of a helix screw, the number of times that a time derivative value of the number of rotations of a helix screw has exceeded a predetermined value, the number of times that the time derivative value of the number of rotations of a helix screw has fallen below the predetermined value, a time integral value of the number of rotations of a helix screw, the number of rotations of a turbine, the number of times that a time derivative value of the number of rotations of a turbine has exceeded a predetermined value, the number of times that the time derivative value of the number of rotations of a turbine has fallen below the predetermined value, a time integral value of the number of rotations of a turbine, the number of rotations of a propeller, the number of times that a time derivative value of the number of rotations of a propeller has exceeded a predetermined value, the number of times that the time derivative value of the number of rotations of a propeller has fallen below the predetermined value, a time integral value of the number of rotations of a propeller, the number of times that a coolant temperature or an oil temperature of an engine of the permanent-open-cabin vehicle 6 has exceeded a predetermined temperature, the number of times that the coolant temperature or the oil temperature of the engine of the permanent-open-cabin vehicle 6 has fallen below the predetermined temperature, a time integral value of the coolant temperature or the oil temperature of the engine of the permanent-open-cabin vehicle 6, a battery current, a time integral value of the battery current, the number of times that a time derivative value of the battery current has exceeded a predetermined value, the number of times that the time derivative value of the battery current has fallen below the predetermined value, a battery voltage, the number of times that a time derivative value of a value obtained by dividing the battery current by the battery voltage has exceeded a predetermined value, or the number of times that the time derivative value of the value obtained by dividing the battery current by the battery voltage has fallen below the predetermined value.

Alternatively, the permanent-open-cabin vehicle usage amount data may be latest permanent-open-cabin vehicle usage amount data. The latest permanent-open-cabin vehicle usage amount data is permanent-open-cabin vehicle usage amount data that is most recently obtained. Further alternatively, the permanent-open-cabin vehicle usage amount data may be current permanent-open-cabin vehicle usage amount data. Still further alternatively, the permanent-open-cabin vehicle usage amount data may be permanent-open-cabin vehicle usage amount differential data. For example, the permanent-open-cabin vehicle usage amount differential data may be a difference between the latest permanent-open-cabin vehicle usage amount data and the current permanent-open-cabin vehicle usage amount data.

The indicator data-updating unit 16 is configured to obtain indicator differential data of the permanent-open-cabin vehicle 6 based on the permanent-open-cabin vehicle usage amount data, the permanent-open-cabin vehicle usage amount data obtained by the permanent-open-cabin vehicle usage amount data-obtaining unit 18, the permanent open-cabin vehicle 6 identified by the permanent-open-cabin vehicle identification data, the permanent-open-cabin vehicle identification data obtained by the permanent-open-cabin vehicle usage amount data-obtaining unit 18. The indicator differential data corresponds to an amount of increase in the indicator data, the amount of increase being obtained based on the permanent-open-cabin vehicle usage amount data. That is, the indicator differential data can be obtained by use of the permanent-open-cabin vehicle usage amount data. The permanent-open-cabin vehicle usage amount data may be the permanent-open-cabin vehicle usage amount differential data, the latest permanent-open-cabin vehicle usage amount data, or the current permanent-open-cabin vehicle usage amount data.

The indicator data-updating unit 16 is configured to update, based on the indicator differential data, the indicator data of the permanent-open-cabin vehicle 6 identified by the permanent-open-cabin vehicle identification data obtained by the permanent-open-cabin vehicle usage amount data-obtaining unit 18, the indicator data being stored in the indicator data storage unit 24. The indicator data-updating unit 16 may add the indicator differential data to the indicator data stored in the indicator data storage unit 24, for example. With this configuration, the indicator data increases as the permanent-open-cabin vehicle usage amount data increases.

According to the indicator data output system 1, it is possible to enable the user to grasp an increase in usage amount of the permanent-open-cabin vehicle 6 in a simple manner, while suppressing or reducing an increase in data processing load on the indicator data output device 2x. More specifically, the indicator data-updating unit 16 obtains the indicator differential data based on the permanent-open-cabin vehicle usage amount data. The indicator differential data corresponds to an amount of increase in the indicator, the amount of increase being obtained based on the permanent-open-cabin vehicle usage amount data. Therefore, when the permanent-open-cabin vehicle usage amount data increases as the permanent-open-cabin vehicle 6 is used, the indicator differential data increases. Then, based on the indicator differential data, the indicator data-updating unit 16 obtains the indicator data. Accordingly, the indicator data increases as the permanent-open-cabin vehicle 6 is used. Therefore, the user can grasp the increase in usage amount of the permanent-open-cabin vehicle 6 by checking the indicator data. In particular, the indicator data output device 2x outputs a single piece of vehicle usage amount data. Consequently, based on the indicator data, the user can grasp the increase in usage amount of the permanent-open-cabin vehicle 6 in a simple manner. By grasping the increase in usage amount of the permanent-open-cabin vehicle 6, the user can recognize the necessity for maintenance in a simple manner, for example.

In addition, the indicator data output device 2x outputs a single piece of vehicle usage amount data. Therefore, the load applied to the indicator data output device 2x at the time of updating and outputting of the indicator data is small. Thus, according to the indicator data output system 1, it is possible to enable the user to grasp the increase in usage amount of the permanent-open-cabin vehicle 6 in a simple manner, while suppressing or reducing the increase in the data processing load on the indicator data output device 2x.

First Embodiment

The following will describe an indicator data output device and an indicator data output method according to a first embodiment. The indicator data output method is a method that is to be executed by the indicator data output device.

[Overall Configuration of Indicator Data Output System]

Figure 3A:
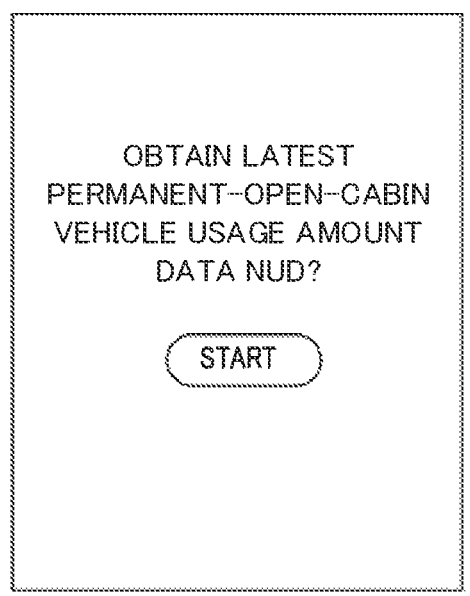
FIG. 3A shows one example of an image displayed on an input/output unit 32.
Figure 4:
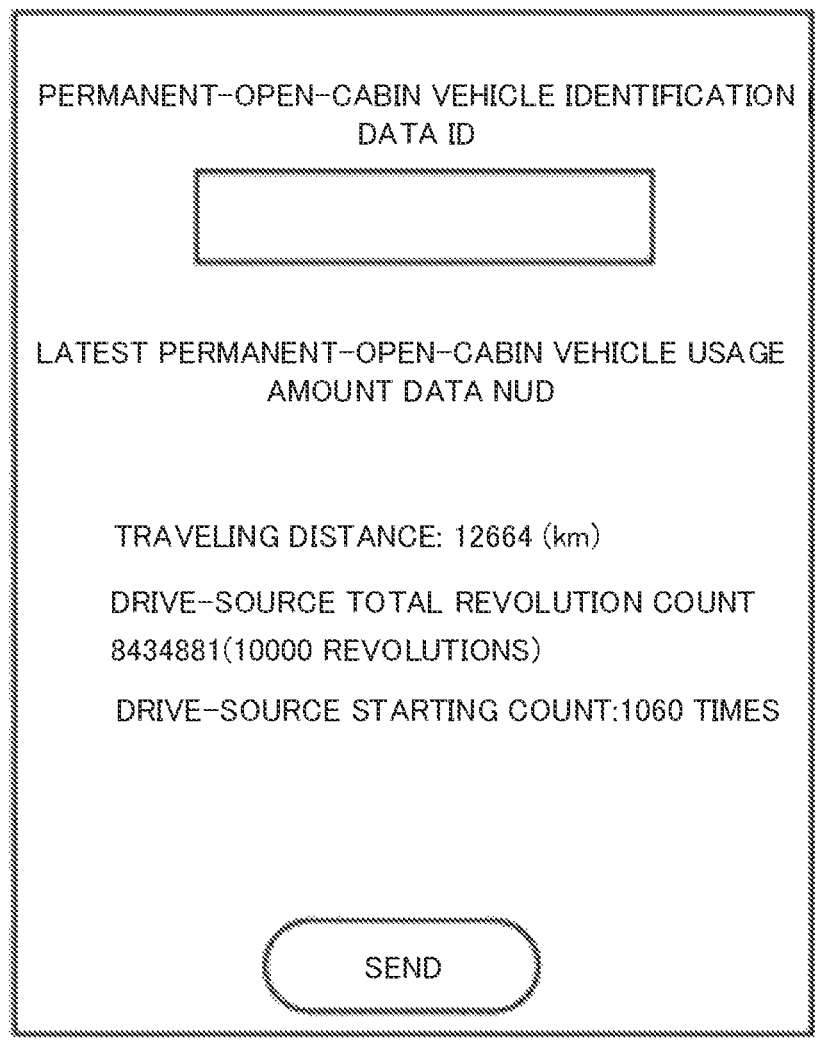
FIG. 4 shows one example of an image displayed on the input/output unit 32.

With reference to the drawings, the following will describe an overall configuration of an indicator data output system 1a. FIG. 1B is a block diagram of an overall configuration of the indicator data output system 1a, 1b. FIG. 2 shows a latest permanent-open-cabin vehicle usage amount data table stored in a storage unit 44. FIG. 3A shows one example of an image displayed on an input/output unit 32. FIG. 3B is a sequence diagram showing data communication in the indicator data output system 1a. FIG. 4 shows one example of an image displayed on the input/output unit

Figure 7:
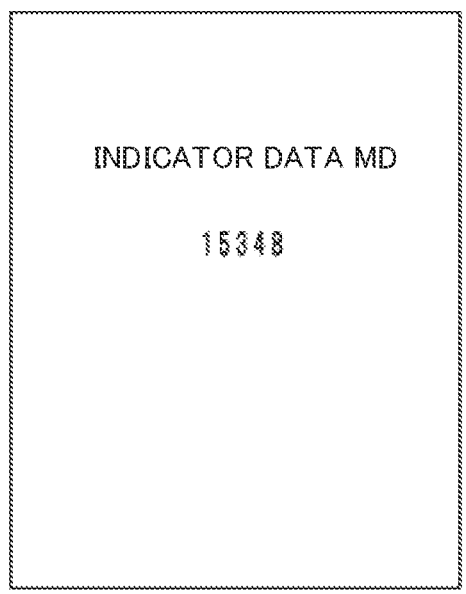
FIG. 7 shows one example of an image displayed on the input/output unit 32.

32. FIG. 5 shows an indicator data table stored in the indicator data storage unit 24. FIG. 6 shows a conversion table stored in a conversion table storage unit 26. FIG. 7 shows one example of an image displayed on the input/output unit 32.

As shown in FIG. 1B, the indicator data output system 1a includes a server 2 (one example of the indicator data output device), a portable terminal 4, and a permanent-open-cabin vehicle 6. The indicator data output system 1a notifies a state related to usage of the permanent-open-cabin vehicle 6 to a user of the permanent-open-cabin vehicle 6 via the portable terminal 4.

The permanent-open-cabin vehicle 6 is a vehicle without a roof fixedly provided for a driver's seat. Thus, the permanent-open-cabin vehicle 6 does not encompass a vehicle with a roof undetachably provided for a driver's seat. The roof is a member covering an upper side, a front side, a rear side, a left side, and a right side of the driver's seat. That is, the roof includes a front window, a rear window, and side windows, for example. Accordingly, the roof does not encompass a member covering only the upper side of the driver's seat and not covering the front side, the rear side, the left side, or the right side of the driver's seat, for example. In addition, the roof does not encompass a member covering the upper side of the driver's seat and not covering at least one of the front side, the rear side, the left side, or the right side of the driver's seat, for example. Thus, the permanent-open-cabin vehicle 6 may include the member covering only the upper side of the driver's seat and not covering the front side, the rear side, the left side, or the right side of the driver's seat. Alternatively, the permanent-open-cabin vehicle 6 may include the member covering the upper side of the driver's seat and not covering at least one of the front side, the rear side, the left side, or the right side of the driver's seat. The permanent-open-cabin vehicle 6 does not encompass a vehicle that cannot be used with its roof detached from a driver's seat. That is, the permanent-open-cabin vehicle 6 does not encompass a vehicle that is not designed on the assumption of use in a state where a roof is detached from a driver's seat.

The permanent-open-cabin vehicle 6 may be any vehicle, as long as it satisfies the above-described conditions. Examples of the permanent-open-cabin vehicle 6 encompass a two-wheeled motor vehicle, a three-wheeled motor vehicle, a trike, an all-terrain vehicle (ATV), a recreational off-highway vehicle (ROV), a boat, a sailing yacht, a motor yacht, a watercraft, a snowmobile, a power assisted bicycle, a bicycle, a golf cart, a land car, a racing cart, a go-cart, a mower, a snowplow, a cultivator, a rice reaping machine, a helicopter, and a light aircraft, etc. As described above, the permanent-open-cabin vehicle 6 encompasses not only a vehicle driven only by power generated by a drive source but also a vehicle driven by power generated by a drive source and human power, a vehicle driven by power generated by a drive source and wind power, a vehicle driven only by human power, and a vehicle driven only by wind power. The three-wheeled motor vehicle encompasses a three-wheeled motor vehicle whose vehicle body frame leans to the left or right while the vehicle is making a turn to the left or right and a three-wheeled motor vehicle whose vehicle body frame does not lean to the left or right while the vehicle is making a turn to the left or right. The permanent-open-cabin vehicle 6 does not encompass a four-wheeled motor vehicle (a standard-sized automobile, a light automobile) permitted to drive on a public road. The four-wheeled motor vehicle also encompasses a vehicle with four or more wheels. In the present embodiment, the permanent-open-cabin vehicle 6 is a two-wheeled motor vehicle.

The permanent-open-cabin vehicle 6 includes a vehicle body frame 60, a front wheel 62, a rear wheel 64, a drive source 66, and a steering mechanism 68. The vehicle body frame 60 leans to the left while the permanent-open-cabin vehicle 6 is making a turn to the left. The vehicle body frame 60 leans to the right while the permanent-open-cabin vehicle 6 is making a turn to the right.

The steering mechanism 68 is supported at a front end of the vehicle body frame 60. The steering mechanism 68 steers the front wheel 62 in response to rider's manipulation. The steering mechanism 68 includes a handle, a steering shaft, and a front fork. The handle, steering shaft, and front fork are identical in structure to a generally-used handle, steering shaft, and front fork. Therefore, a description thereof is omitted here.

The front wheel 62 is a steering wheel of the permanent-open-cabin vehicle 6. The front wheel 62 is disposed in a front portion of the permanent-open-cabin vehicle 6. The front wheel 62 is supported by the vehicle body frame 60 via the steering mechanism 68. The rider can manipulate the handle of the steering mechanism 68 to steer the front wheel 62.

The rear wheel 64 is a driving wheel of the permanent-open-cabin vehicle 6. The rear wheel 64 is disposed in a rear portion of the permanent-open-cabin vehicle 6. The rear wheel 64 is supported by the vehicle body frame 60 via a swing arm. The rear wheel 64 is rotated by drive power from a drive source 66 (described later).

The drive source 66 is configured to generate drive power for rotating the rear wheel 64. The drive source 66 may be an engine, an electric motor, and/or the like. In the present embodiment, the drive source 66 is an engine. The drive source 66 is supported by the vehicle body frame 60. The drive power generated by the drive source 66 is transmitted to the rear wheel 64 via a transmission mechanism, such as a transmission. With this configuration, the rear wheel 64 is rotated by the drive power generated by the drive source 66.

The permanent-open-cabin vehicle 6 further includes an electric control unit (ECU) 40, a Bluetooth (registered trademark) (BT) communication unit 42, the storage unit 44, and a sensor group 46.

The ECU 40 controls operation of the BT communication unit 42, the storage unit 44, and the sensor group 46. The ECU 40 is made of combination of an integrated circuit (IC), an electric component, and a circuit board, for example.

The BT communication unit 42 communicates with a BT communication unit 36 (described later) over a near-field communication network. In the present embodiment, the near-field communication network in compliance with the Bluetooth (registered trademark) standard is employed. However, the near-field communication network standard is not limited to Bluetooth (registered trademark).

The storage unit 44 stores a program that is to be executed by the ECU 40. The storage unit 44 may be a nonvolatile memory, for example. The sensor group 46 includes plural sensors for detecting states of elements of the permanent-open-cabin vehicle 6.

The following will give detailed descriptions of configurations in the permanent-open-cabin vehicle 6. The storage unit 44 stores the latest permanent-open-cabin vehicle usage amount data table shown in FIG. 2. The latest permanent-open-cabin vehicle usage amount data table includes latest permanent-open-cabin vehicle usage amount data NUD (latest vehicle usage amount data). The latest permanent-open-cabin vehicle usage amount data NUD is permanent-opencabin vehicle usage amount data UD (vehicle usage amount data) that is most recently obtained. The permanent-open-cabin vehicle usage amount data UD indicates a usage amount of the permanent-open-cabin vehicle 6. Thus, as the permanent-open-cabin vehicle 6 is used, the permanent-open-cabin vehicle usage amount data UD increases. The permanent-open-cabin vehicle usage amount data UD may increase continuously, as the permanent-open-cabin vehicle 6 is used. Alternatively, the permanent-open-cabin vehicle usage amount data UD may increase non-continuously, as the permanent-open-cabin vehicle 6 is used. The permanent-open-cabin vehicle usage amount data UD includes a first indicator and/or a second indicator, the first indicator of which a dimension index not being zero regarding at least one of a length-related dimension index, a mass-related dimension index, a time-related dimension index, an electric current-related dimension index, a thermodynamic temperature-related dimension index, a substance amount-related dimension index, or a luminosity-related dimension index, the second indicator indicating the number of times of which a dimension index is zero regarding each of a length-related dimension index, a mass-related dimension index, the time-related dimension index, an electric current-related dimension index, a thermodynamic temperature-related dimension index, a substance amount-related dimension index, and a luminosity-related dimension index. The permanent-open-cabin vehicle usage amount data UD includes two or more indicators. In the present embodiment, the permanent-open-cabin vehicle usage amount data UD includes a total traveling distance of the permanent-open-cabin vehicle 6, a total number of revolutions of the drive source 66 (hereinafter, referred to as a drive-source total revolution count), and the number of times of starting the drive source 66 (hereinafter, referred to as a drive-source starting count). The total traveling distance of the permanent-open-cabin vehicle 6 is a total traveling distance accumulated during a period from the time of manufacturing of the permanent-open-cabin vehicle 6 to the present. The traveling distance is a concept encompassing not only a distance of traveling on the ground but also a distance of cruising on water and a distance of flying in the air. The traveling distance means a distance that the permanent-open-cabin vehicle 6 has traveled, cruised, or flied with its own power, and does not mean a distance that the permanent-open-cabin vehicle 6 is transported by another means of transportation. The drive-source total revolution count is a total number of revolutions of the drive source 66 counted during the period from the time of manufacturing of the permanent-open-cabin vehicle 6 to the present. The drive-source starting count is a total number of times of starting of the drive source 66 counted during the period from the time of manufacturing of the permanent-open-cabin vehicle 6 to the present.

The sensor group 46 detects states of the elements of the permanent-open-cabin vehicle 6 so that the ECU 40 can obtain the latest permanent-open-cabin vehicle usage amount data NUD. The sensor group 46 include a rear-wheel rotation sensor, a drive-source revolution sensor, and a drive-source start sensor, for example.

The rear-wheel rotation sensor is a sensor for detecting rotation of the rear wheel 64. The ECU 40 counts a total number of rotations of the rear wheel 64 based on a signal outputted from the rear-wheel rotation sensor. With this, based on the total number of rotations of the rear wheel 64 and the diameter of the rear wheel 64, the ECU 40 can calculate a total traveling distance of the permanent-open-cabin vehicle 6. The ECU 40 records the total traveling distance of the permanent-open-cabin vehicle 6 in the latest permanent-open-cabin vehicle usage amount data table shown in FIG. 2.

The drive-source revolution sensor is a sensor for detecting revolutions of the crankshaft of the drive source 66 (engine). The ECU 40 counts a total number of revolutions (drive-source total revolution count) of the drive source 66 (engine) based on a signal from the drive-source revolution sensor. The ECU 40 records the drive-source total revolution count in the latest permanent-open-cabin vehicle usage amount data table shown in FIG. 2.

The drive-source start sensor is a sensor for detecting starting of the drive source 66. The ECU 40 counts the number of times of starting of the drive source 66 (hereinafter, referred to as a drive-source starting count) of the permanent-open-cabin vehicle 6 based on a signal from the drive-source start sensor. The ECU 40 records the drive-source starting count in the latest permanent-open-cabin vehicle usage amount data table shown in FIG. 2.

The portable terminal 4 may be a smartphone owned by the user, for example. The portable terminal 4 is communicable with the server 2 and the permanent-open-cabin vehicle 6. As shown in FIG. 1B, the portable terminal 4 includes a central processor unit (CPU) 30, the input/output unit 32, a storage unit 34, a BT communication unit 36, and a communication unit 38.

The CPU 30 controls operation of the input/output unit 32, the storage unit 34, and the BT communication unit 36. The storage unit 34 stores a program that is to be executed by the CPU 30. The storage unit 34 may be a nonvolatile memory, for example.

The input/output unit 32 serves as an input interface via which a user's input can be accepted, and also serves as a display device for displaying information for the user. The input/output unit 32 may be a display device with a touch panel, for example. Thus, the user can operate the portable terminal 4 by manipulating the input/output unit 32 with his/her finger. The portable terminal 4 can present information to the user by displaying an image on the input/output unit 32. The display device may be a liquid crystal display or an organic electroluminescence (EL) display.

The BT communication unit 36 communicates with the BT communication unit 42 over a near-field communication network. The communication unit 38 communicates with the server 2 over the Internet.

The following will give detailed descriptions of configurations in the portable terminal 4. The input/output unit 32 displays an image for obtaining the latest permanent-open-cabin vehicle usage amount data shown in FIG. 3A. The image shown in FIG. 3A is an image used to inquire of the user whether to obtain the latest permanent-open-cabin vehicle usage amount data NUD. The image shown in FIG. 3A includes a "START" button. The "START" button is a button for indicating that the portable terminal 4 starts obtaining the latest permanent-open-cabin vehicle usage amount data NUD. When the user touches the START button, the BT communication unit 36 (see FIG. 1B) transmits a permanent-open-cabin vehicle usage amount data request RQ to the permanent-open-cabin vehicle 6, as shown in FIG. 3B. The permanent-open-cabin vehicle usage amount data request RQ is data that the portable terminal 4 uses to request the latest permanent-open-cabin vehicle usage amount data NUD from the permanent-open-cabin vehicle 6.

As shown in FIG. 3B, the BT communication unit 42 (see FIG. 1B) receives the permanent-open-cabin vehicle usage amount data request RQ transmitted from the portable terminal 4. Then, as shown in FIG. 3B, the BT communication unit 42 (see FIG. 1B) transmits the latest permanent-open-cabin vehicle usage amount data NUD (see FIG. 2) to the portable terminal 4.

As shown in FIG. 3B, the BT communication unit 36 (see FIG. 1B) receives the latest permanent-open-cabin vehicle usage amount data NUD transmitted from the permanent-open-cabin vehicle 6. The input/output unit (see FIG. 1B) displays an image for transmitting the latest permanent-open-cabin vehicle identification data shown in FIG. 4. The image for transmitting the latest permanent-open-cabin vehicle identification data shown in FIG. 4 is an image used to inquire of the user whether to transmit the permanent-open-cabin vehicle identification data ID (vehicle identification data) and the latest permanent-open-cabin vehicle usage amount data NUD from the portable terminal 4 to the server 2. The image for transmitting the latest permanent-open-cabin vehicle identification data shown in FIG. 4 includes a box to which the user can input the permanent-open-cabin vehicle identification data ID of the permanent-open-cabin vehicle 6. The permanent-open-cabin vehicle identification data ID is data that the server 2 uses to identify the permanent-open-cabin vehicle 6. For example, the permanent-open-cabin vehicle identification data ID may be ID assigned to the permanent-open-cabin vehicle 6. For another example, the permanent-open-cabin vehicle identification data ID may be a character string given by the server 2 when the user registers the permanent-open-cabin vehicle 6 in the server 2. For further another example, the permanent-open-cabin vehicle identification data ID may be a character string determined by the user when the user registers the permanent-open-cabin vehicle 6 in the server 2.

The image for transmitting the latest permanent-open-cabin vehicle identification data shown in FIG. 4 further includes the latest permanent-open-cabin vehicle usage amount data NUD. In addition, the image for transmitting the latest permanent-open-cabin vehicle identification data shown in FIG. 4 further includes a "SEND" button. The "SEND" button is a button for indicating that the portable terminal 4 starts transmitting the permanent-open-cabin vehicle identification data ID and the latest permanent-open-cabin vehicle usage amount data NUD.

The user inputs the permanent-open-cabin vehicle identification data ID of the permanent-open-cabin vehicle 6 via the image for transmitting the latest permanent-open-cabin vehicle identification data shown in FIG. 4 (see FIG. 3B). The user touches the "SEND" button. As shown in FIG. 3B, the communication unit 38 transmits, to the server 2, the permanent-open-cabin vehicle identification data ID and the latest permanent-open-cabin vehicle usage amount data NUD.

The server 2 is a computer providing a service of the indicator data output system 1a. As shown in FIG. 1B, the server 2 includes a CPU 10, a communication unit 12, and a storage unit 14.

The CPU 10 controls operation of the communication unit 12 and the storage unit 14. The communication unit 12 communicates with the portable terminal 4 over the Internet. The storage unit 14 stores a program that is to be executed by the CPU 10. The storage unit 14 may be a nonvolatile memory, for example.

The following will give detailed descriptions of configurations in the server 2. The storage unit 14 includes the indicator data storage unit 24 and the conversion table storage unit 26. The indicator data storage unit 24 stores permanent-open-cabin vehicle identification data ID, indicator data MD, and permanent-open-cabin vehicle usage amount data UD in association with each other. In the present embodiment, the indicator data storage unit 24 stores the indicator data table shown in FIG. 5. In the indicator data table, the permanent-open-cabin vehicle identification data ID, the indicator data MD, and the permanent-open-cabin vehicle usage amount data UD (the total traveling distance, the drive-source total revolution count, and the drive-source starting count) are associated with each other. The indicator data MD is data indicating a simple indicator related to a usage amount of the permanent-open-cabin vehicle 6. The indicator data MD includes a dimensionless indicator of which a dimension index is zero, regarding each of a length-related dimension index, a mass-related dimension index, a time-related dimension index, an electric current-related dimension index, a thermodynamic temperature-related dimension index, a substance amount-related dimension index, or a luminosity-related dimension index. The indicator data MD includes an indicator that increases along with an increase in the latest permanent-open-cabin vehicle usage amount data NUD.

Every time latest permanent-open-cabin vehicle usage amount data NUD is transmitted from the portable terminal 4 to the server 2, the permanent-open-cabin vehicle usage amount data UD shown in FIG. 5 is updated to the latest permanent-open-cabin vehicle usage amount data NUD. Therefore, the permanent-open-cabin vehicle usage amount data UD shown in FIG. 5 is not always consistent with the latest permanent-open-cabin vehicle usage amount data NUD shown in FIG. 2. At a point of time immediately after updating of the permanent-open-cabin vehicle usage amount data UD, the permanent-open-cabin vehicle usage amount data UD is consistent with the latest permanent-open-cabin vehicle usage amount data NUD. Meanwhile, if the permanent-open-cabin vehicle 6 is used after updating of the permanent-open-cabin vehicle usage amount data UD, the permanent-open-cabin vehicle usage amount data UD becomes inconsistent with the latest permanent-open-cabin vehicle usage amount data NUD.

The conversion table storage unit 26 stores the conversion table shown in FIG. 6. The conversion table includes a rate RT. The rate RT is a ratio between the indicator data MD and the permanent-open-cabin vehicle usage amount data UD. In the present embodiment, the rate RT is a value obtained by dividing the indicator data MD by the permanent-open-cabin vehicle usage amount data UD. For example, as the permanent-open-cabin vehicle 6 travels one kilometer, the indicator data MD increases by one. For another example, as the drive source 66 of the permanent-open-cabin vehicle 6 revolves 10000 times, the indicator data MD increases by one. For further another example, as the drive source 66 of the permanent-open-cabin vehicle 6 is started once, the indicator data MD increases by one. Each of these values of the rate RT is shown merely by way of example, and is not limitative.

The communication unit 12 includes the permanent-open-cabin vehicle usage amount data-obtaining unit 18 (vehicle usage amount data-obtaining unit). The permanent-open-cabin vehicle usage amount data-obtaining unit 18 is configured to obtain permanent-open-cabin vehicle identification data ID and latest permanent-open-cabin vehicle usage amount data NUD (one example of the vehicle usage amount data) indicating a usage amount of the permanent-open-cabin vehicle 6 identified by the permanent-open-cabin vehicle identification data ID. More specifically, the permanent-open-cabin vehicle usage amount data-obtaining unit 18 receives the permanent-open-cabin vehicle identification data ID and the latest permanent-open-cabin vehicle usage amount data NUD from the portable terminal 4, as shown in FIG. 3B. The permanent-open-cabin vehicle usage amount data-obtaining unit 18 obtains the permanent-open-cabin vehicle identification data ID and the latest permanent-open-cabin vehicle usage amount data NUD by radio communication.

The CPU 10 includes the indicator data-updating unit 16. Based on the latest permanent-open-cabin vehicle usage amount data NUD, the indicator data-updating unit 16 updates the indicator data MD stored in the indicator data storage unit 24 by the two steps. Indicator differential data DMD corresponds to an amount of increase in the indicator data MD, the amount of increase being obtained based on the latest permanent-open-cabin vehicle usage amount data NUD.

A first step: Based on the latest permanent-open-cabin vehicle usage amount data NUD obtained by the permanent-open-cabin vehicle usage amount data-obtaining unit 18, the indicator data-updating unit 16 obtains indicator differential data DMD of the permanent-open-cabin vehicle 6 identified by the permanent-open-cabin vehicle identification data ID obtained by the permanent-open-cabin vehicle usage amount data-obtaining unit 18.

A second step: Based on the indicator differential data DMD, the indicator data-updating unit 16 updates the indicator data MD of the permanent-open-cabin vehicle 6 identified by the permanent-open-cabin vehicle identification data ID obtained by the permanent-open-cabin vehicle usage amount data-obtaining unit 18, the indicator data MD being stored in the indicator data storage unit 24.

The following will specifically describe the first and second steps. The indicator data-updating unit 16 obtains, from the indicator data table shown in FIG. 5, permanent-open-cabin vehicle usage amount data UD associated with the permanent-open-cabin vehicle identification data ID of the permanent-open-cabin vehicle 6.

As shown in FIG. 3B, the indicator data-updating unit 16 obtains permanent-open-cabin vehicle usage amount differential data DUD (vehicle usage amount differential data). The permanent-open-cabin vehicle usage amount differential data DUD is data indicating a difference between the latest permanent-open-cabin vehicle usage amount data NUD and the permanent-open-cabin vehicle usage amount data UD. The indicator data-updating unit 16 calculates the permanent-open-cabin vehicle usage amount differential data DUD by subtracting the permanent-open-cabin vehicle usage amount data UD stored in the indicator data storage unit 24 from the latest permanent-open-cabin vehicle usage amount data NUD obtained by the permanent-open-cabin vehicle usage amount data-obtaining unit 18.

As shown in FIG. 3B, the indicator data-updating unit 16 obtains indicator differential data DMD based on the permanent-open-cabin vehicle usage amount differential data DUD and the conversion table shown in FIG. 6. The indicator differential data DMD corresponds to an amount of increase in the indicator data MD, the amount of increase being obtained based on the permanent-open-cabin vehicle usage amount differential data DUD. The indicator data-updating unit 16 calculates the indicator differential data DMD by multiplying the permanent-open-cabin vehicle usage amount differential data DUD by the rate RT indicated in the conversion table shown in FIG. 6. Consequently, the first step is completed.

As shown in FIG. 3B, the indicator data-updating unit 16 obtains new indicator data MD based on the indicator data MD and the indicator differential data DMD. More specifically, the indicator data-updating unit 16 adds the indicator differential data DMD to the indicator data MD.

As shown in FIG. 3B, the indicator data-updating unit 16 updates the indicator data MD in the indicator data table shown in FIG. 5 to the new indicator data MD. In addition, the indicator data-updating unit 16 updates the permanent-open-cabin vehicle usage amount data UD in the indicator data table shown in FIG. 5 to the latest permanent-open-cabin vehicle usage amount data NUD. Consequently, the second step is completed.

The communication unit 12 further includes the indicator data output unit 20. The indicator data output unit 20 outputs, to the portable terminal 4, the indicator data MD stored in the indicator data storage unit 24. That is, as shown in FIG. 3B, the indicator data output unit 20 outputs, to the portable terminal 4, the indicator data MD stored in the indicator data storage unit 24.

As shown in FIG. 3B, the communication unit 38 receives the indicator data MD from the server 2. As shown in FIG. 3B, the input/output unit 32 displays an image for displaying the indicator data shown in FIG. 7. The image for displaying the indicator data shown in FIG. 7 includes the indicator data MD of the permanent-open-cabin vehicle 6. This enables the user to see the indicator data MD of the permanent-open-cabin vehicle 6.

[Operation of Indicator Data Output System]

Figure 8:
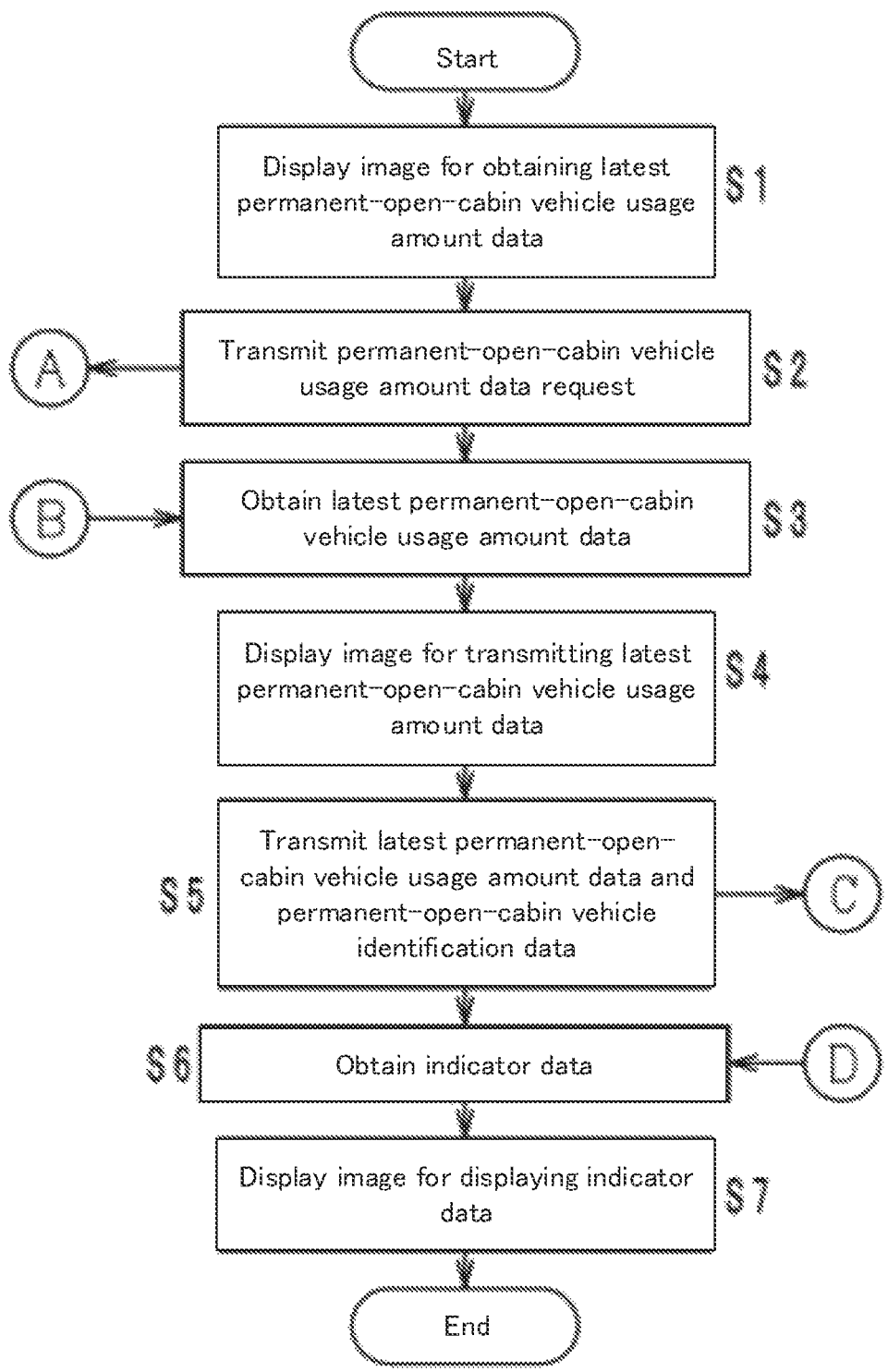
FIG. 8 is a flowchart of operation of a CPU 30 of a portable terminal 4.
Figure 9:
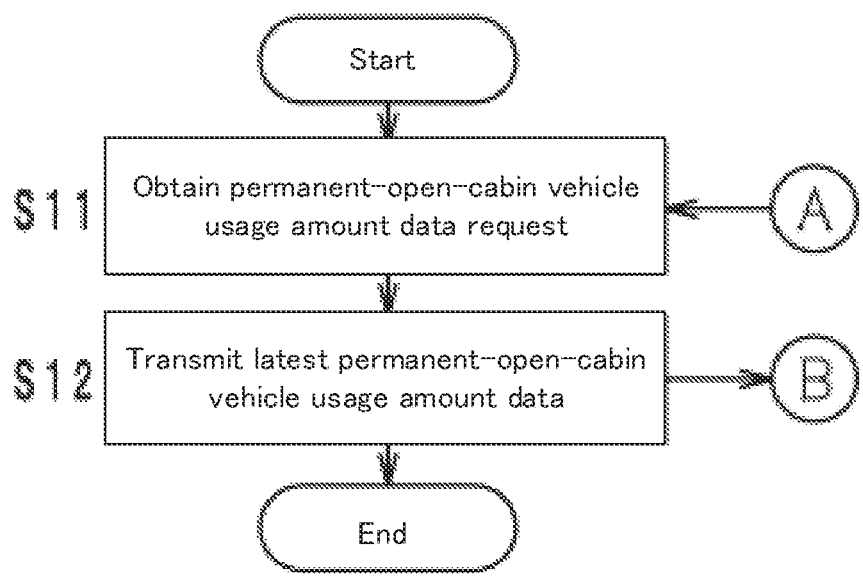
FIG. 9 is a flowchart of operation of an ECU 40 of a permanent-open-cabin vehicle 6.
Figure 10:
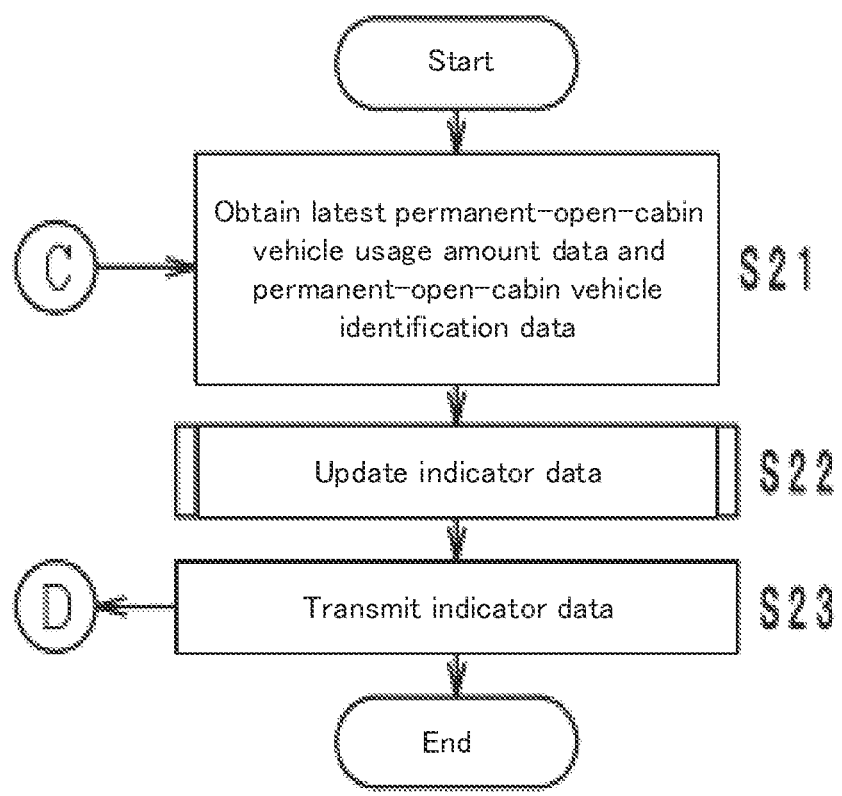
FIG. 10 is a flowchart of operation of a CPU 10 of a server 2.
Figure 11:
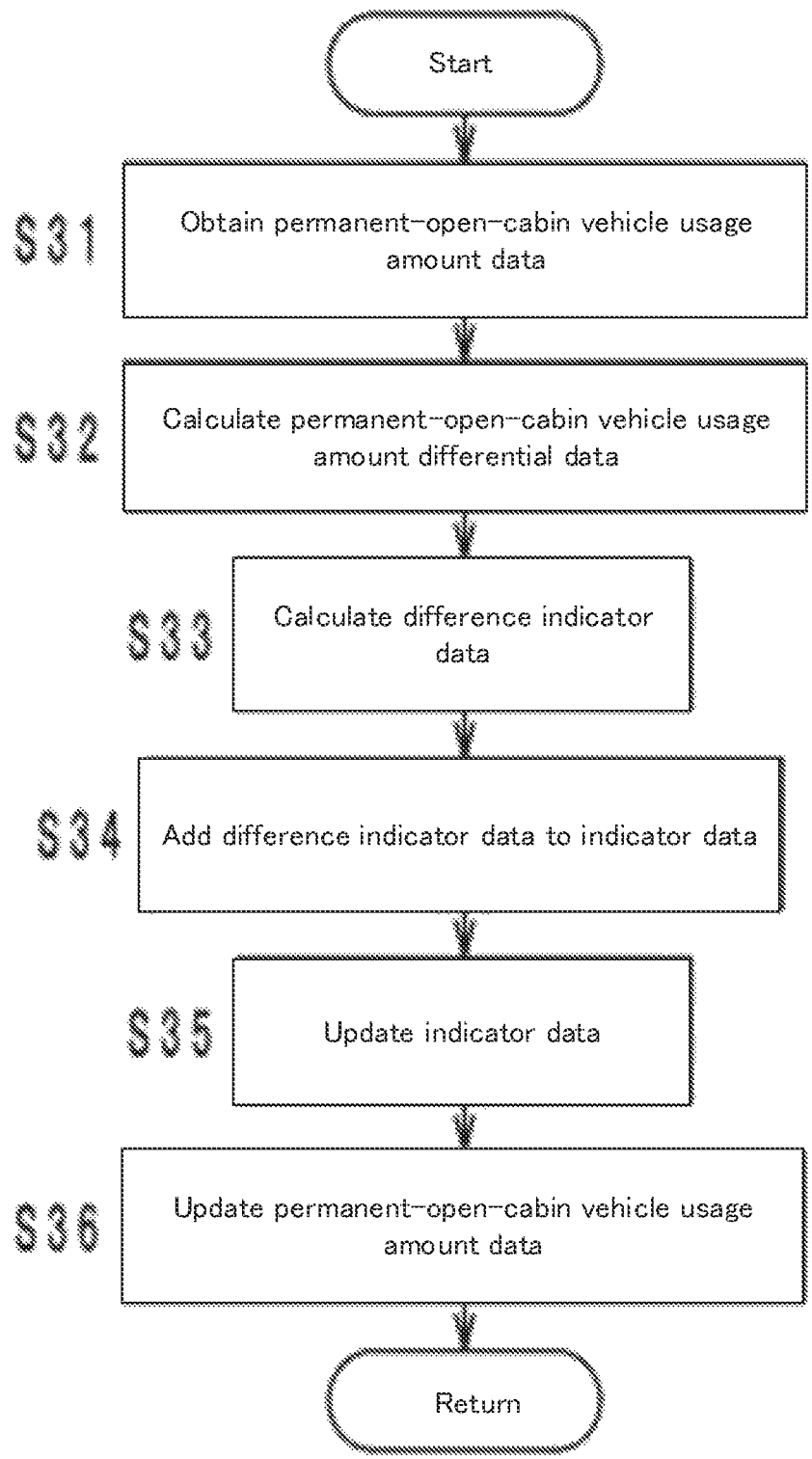
FIG. 11 is a flowchart of a subroutine of step S22 shown in FIG. 10.

Next, with reference to the drawings, the following will describe operation of the indicator data output system 1a. FIG. 8 is a flowchart of operation of the CPU 30 of the portable terminal 4. FIG. 9 is a flowchart of operation of the ECU 40 of the permanent-open-cabin vehicle 6. FIG. 10 is a flowchart of operation of the CPU 10 of the server 2. FIG. 11 is a flowchart of a subroutine of step S22 shown in FIG. 10. The CPU 30 executes the operation indicated by the flowchart shown in FIG. 8 by executing the program stored in the storage unit 34. The ECU 40 executes the operation indicated by the flowchart shown in FIG. 9 by executing the program stored in the storage unit 44. The CPU 10 executes the operation indicated by the flowchart shown in FIGS. 10 and 11 by executing the program stored in the storage unit 14.

The processing is started when the user starts an application in the portable terminal 4. The CPU 30 instructs the input/output unit 32 to display an image for obtaining latest permanent-open-cabin vehicle usage amount data shown in FIG. 3A (step S1 in FIG. 8). In response to this, the input/output unit 32 displays the image for obtaining the latest permanent-open-cabin vehicle usage amount data shown in FIG. 3A.

The user touches the "START" button in the image for obtaining the latest permanent-open-cabin vehicle usage amount data. In response to this, the CPU 30 instructs the BT communication unit 36 to transmit a permanent-open-cabin vehicle usage amount data request RQ to the permanent-open-cabin vehicle 6 (step S2 in FIG. 8). In response to this, the BT communication unit 36 transmits the permanent-open-cabin vehicle usage amount data request RQ to the permanent-open-cabin vehicle 6.

The BT communication unit 42 receives the permanent-open-cabin vehicle usage amount data request RQ, and outputs the permanent-open-cabin vehicle usage amount data request RQ to the ECU 40. Consequently, the ECU 40 obtains the permanent-open-cabin vehicle usage amount data request RQ (step S11 in FIG. 9). The ECU 40 refers to the latest permanent-open-cabin vehicle usage amount data table shown in FIG. 2, and obtains latest permanent-open-cabin vehicle usage amount data NUD. The latest permanent-open-cabin vehicle usage amount data NUD includes a total traveling distance, a drive-source total revolution count, and a drive-source starting count. The total traveling distance is 12664 km. The drive-source total revolution count is 8434881*10000 revolutions. The drive-source starting count is 1060 times. Thereafter, the ECU 40 instructs the BT communication unit 42 to transmit the latest permanent-open-cabin vehicle usage amount data NUD to the portable terminal 4 (step S12 in FIG. 9). In response to this, the BT communication unit 42 transmits the latest permanent-open-cabin vehicle usage amount data NUD to the portable terminal 4.

The BT communication unit 36 receives the latest permanent-open-cabin vehicle usage amount data NUD, and outputs the latest permanent-open-cabin vehicle usage amount data NUD to the CPU 30. Consequently, the CPU 30 obtains the latest permanent-open-cabin vehicle usage amount data NUD (step S3 in FIG. 8). Furthermore, the CPU 30 instructs the input/output unit 32 to display an image for transmitting the latest permanent-open-cabin vehicle identification data shown in FIG. 4 (step S4 in FIG. 8). In response to this, the input/output unit 32 displays the image for transmitting the latest permanent-open-cabin vehicle identification data shown in FIG. 4.

The user inputs, as the permanent-open-cabin vehicle identification data ID of the permanent-open-cabin vehicle 6, "AAA" to a box in the image for transmitting the latest permanent-open-cabin vehicle identification data via the input/output unit 32. In addition, the user touches the "SEND" button in the image for transmitting the latest permanent-open-cabin vehicle identification data. In response to this, the CPU 30 instructs the communication unit 38 to transmit the latest permanent-open-cabin vehicle usage amount data NUD and the permanent-open-cabin vehicle identification data ID to the server 2 (step S5 in FIG. 8). The communication unit 38 transmits the latest permanent-open-cabin vehicle usage amount data NUD and the permanent-open-cabin vehicle identification data ID to the server 2.

The permanent-open-cabin vehicle usage amount data-obtaining unit 18 receives the latest permanent-open-cabin vehicle usage amount data NUD and the permanent-open-cabin vehicle identification data ID, and outputs the latest permanent-open-cabin vehicle usage amount data NUD and the permanent-open-cabin vehicle identification data ID to the indicator data-updating unit 16. Consequently, the indicator data-updating unit 16 obtains the latest permanent-open-cabin vehicle usage amount data NUD and the permanent-open-cabin vehicle identification data ID (step S21 in FIG. 10). Next, the indicator data-updating unit 16 updates the indicator data MD in the indicator data table shown in FIG. 5 (step S22 in FIG. 10).

The indicator data-updating unit 16 refers to the indicator data table shown in FIG. 5, and obtains the indicator data MD and the permanent-open-cabin vehicle usage amount data UD associated with the permanent-open-cabin vehicle identification data ID "AAA" (step S31 in FIG. 11). The indicator data MD is 15236. The permanent-open-cabin vehicle usage amount data UD includes a total traveling distance, a drive-source total revolution count, and a drive-source starting count. The total traveling distance is 12564 km. The drive-source total revolution count is 8434873*10000 revolutions. The drive-source starting count is 1056 times.

The indicator data-updating unit 16 calculates permanent-open-cabin vehicle usage amount differential data DUD (step S32 in FIG. 11). The indicator data-updating unit 16 subtracts the permanent-open-cabin vehicle usage amount data UD from the latest permanent-open-cabin vehicle usage amount data NUD. The total traveling distance in the latest permanent-open-cabin vehicle usage amount data NUD is 12664 km. The total traveling distance in the permanent-open-cabin vehicle usage amount data UD is 12564 km. Thus, the total traveling distance in the permanent-open-cabin vehicle usage amount differential data DUD is 100 km. The drive-source total revolution count in the latest permanent-open-cabin vehicle usage amount data NUD is 8434881*10000 revolutions. The drive-source total revolution count in the permanent-open-cabin vehicle usage amount data UD is 8434873*10000 revolutions. Thus, the drive-source total revolution count in the permanent-open-cabin vehicle usage amount differential data DUD is 8*10000 revolutions. The drive-source starting count in the latest permanent-open-cabin vehicle usage amount data NUD is 1060 times. The drive-source starting count in the permanent-open-cabin vehicle usage amount data UD is 1056 times. Thus, the drive-source starting count in the permanent-open-cabin vehicle usage amount differential data DUD is 4 times.

The indicator data-updating unit 16 calculates the indicator differential data DMD (step S33 in FIG. 11). The indicator data-updating unit 16 calculates the indicator differential data DMD by multiplying the permanent-open-cabin vehicle usage amount differential data DUD by the rate RT in the conversion table shown in FIG. 6. For example, the indicator differential data DMD associated with the permanent-open-cabin vehicle identification data "AAA" is calculated according to the following formula (1):

$$DMD=100(km)*1(/km)+80000(revolutions)*1(/10000 revolutions)+\text{four times}*1(/time)=112 \quad (1)$$

The indicator data-updating unit 16 adds the indicator differential data DMD to the indicator data MD recorded in the indicator data table shown in FIG. 5 (step S34 in FIG. 11). The indicator data MD is 15236. The indicator differential data DMD is 112. Thus, new indicator data MD is 15348.

The indicator data-updating unit 16 updates the indicator data MD in the indicator data table shown in FIG. 5 to the new indicator data MD, which has been calculated in step S34 (step S35 in FIG. 11). In addition, the indicator data-updating unit 16 updates the permanent-open-cabin vehicle usage amount data UD in the indicator data table shown in FIG. 5 to the latest permanent-open-cabin vehicle usage amount data NUD, which has been obtained in step S21 (step S36 in FIG. 11).

The indicator data-updating unit 16 instructs the indicator data output unit 20 to transmit the new indicator data MD updated in step S35 to the portable terminal 4 (step S23 in FIG. 10). In response to this, the indicator data output unit 20 transmits the indicator data MD to the portable terminal 4.

The communication unit 38 receives the indicator data MD, and outputs the indicator data MD to the CPU 30. Consequently, the CPU 30 obtains the indicator data MD (step S6 in FIG. 8). The CPU 30 instructs the input/output unit 32 to display an image for displaying the indicator data shown in FIG. 7 (step S7 in FIG. 8). In response to this, the input/output unit 32 displays the image for displaying the indicator data shown in FIG. 7. This enables the user to see the indicator data MD of the permanent-open-cabin vehicle 6.

Effects

According to the indicator data output system 1*a*, it is possible to enable the user to grasp an increase in usage amount of the permanent-open-cabin vehicle 6 in a simple manner, while suppressing or reducing an increase in data processing load on the server 2. More specifically, the indicator data-updating unit 16 obtains the indicator differential data DMD based on the latest permanent-open-cabin vehicle usage amount data NUD. The indicator differential data DMD corresponds to an amount of increase in the indicator obtained from the latest permanent-open-cabin vehicle usage amount data NUD. Therefore, when the latest permanent-open-cabin vehicle usage amount data NUD increases as the permanent-open-cabin vehicle 6 is used, the indicator differential data DMD increases. Then, based on the indicator differential data DMD, the indicator data-updating unit 16 obtains the indicator data MD. Thus, the indicator data MD increases, as the permanent-open-cabin vehicle 6 is used. Therefore, the user can grasp the increase in usage amount of the permanent-open-cabin vehicle 6 by checking the indicator data MD. In particular, the indicator data output device 2x outputs a single piece of vehicle usage amount data. Therefore, based on the indicator data MD, the user can grasp the increase in usage amount of the permanent-open-cabin vehicle 6 in a simple manner. By grasping the increase in usage amount of the permanent-open-cabin vehicle 6, the user can easily recognize the necessity for maintenance in a simple manner, for example.

Furthermore, the indicator data output device 2x outputs a single piece of indicator data MD. Therefore, the load applied to the server 2 at the time of updating and outputting of the indicator data MD is small. Thus, according to the indicator data output system 1a, it is possible to enable the user to grasp the increase in usage amount of the permanent-open-cabin vehicle 6 in a simple manner, while suppressing or reducing the increase in the data processing load on the server 2.

The latest permanent-open-cabin vehicle usage amount data NUD includes the total traveling distance, the drive-source total revolution count, and the drive-source starting count. The indicator data-updating unit 16 obtains the indicator differential data DMD based on the latest permanent-open-cabin vehicle usage amount data NUD. This means that the indicator differential data DMD depends on the total traveling distance, drive-source total revolution count, and drive-source starting count. The indicator data-updating unit 16 updates the indicator data MD based on the indicator differential data DMD. This means that the indicator data MD also depends on the total traveling distance, drive-source total revolution count, and drive-source starting count. Therefore, based on the indicator data MD, the user can grasp increases in the total traveling distance, drive-source total revolution count, and drive-source starting count in a simple manner. Consequently, based on the indicator data MD, the user can grasp a state related to maintenance of components that may be deteriorated along with increases in the total traveling distance, drive-source total revolution count, and drive-source starting count, for example. Examples of the component that may be deteriorated along with the increase in the total traveling distance encompass engine oil and a tire, etc. Examples of the component that may be deteriorated along with the increase in the drive-source total revolution count encompass engine oil, an ignition plug, and a timing belt, etc. Examples of the component that may be deteriorated along with the increase in the drive-source starting count encompass a battery.

Second Embodiment

Next, the following will describe an indicator data output system and an indicator data output method according to a second embodiment.

[Overall Configuration of Indicator Data Output System]

With reference to the drawings, the following will describe an overall configuration of an indicator data output system 1b. The overall configuration of the indicator data output system 1b is identical to that of the indicator data output system 1a. Thus, for a block diagram of the overall configuration of the indicator data output system 1b, see FIG. 1B. FIG. 12 shows a permanent-open-cabin vehicle usage amount data table stored in a storage unit 34. FIG. 13 shows an indicator data table stored in an indicator data storage unit 24.

The following will describe differences between the indicator data output system 1a and the indicator data output system 1b. In the indicator data output system 1a, the portable terminal 4 transmits the latest permanent-open-cabin vehicle usage amount data NUD to the server 2. The server 2 stores the permanent-open-cabin vehicle usage amount data UD. The server 2 calculates the permanent-open-cabin vehicle usage amount differential data DUD, which corresponds to the difference between the latest permanent-open-cabin vehicle usage amount data NUD and the permanent-open-cabin vehicle usage amount data UD. The server 2 calculates new indicator data MD based on the permanent-open-cabin vehicle usage amount differential data DUD.

Meanwhile, according to the indicator data output system 1b, a portable terminal 4 stores permanent-open-cabin vehicle usage amount data UD. The portable terminal 4 obtains latest permanent-open-cabin vehicle usage amount data NUD from a permanent-open-cabin vehicle 6. The portable terminal 4 calculates permanent-open-cabin vehicle usage amount differential data DUD by subtracting the permanent-open-cabin vehicle usage amount data UD from the latest permanent-open-cabin vehicle usage amount data NUD. The portable terminal 4 transmits the permanent-open-cabin vehicle usage amount differential data DUD to a server 2. The server 2 calculates new indicator data MD based on the permanent-open-cabin vehicle usage amount differential data DUD. As described above, according to the indicator data output system 1b, the portable terminal 4 calculates the permanent-open-cabin vehicle usage amount differential data DUD. In this point, the indicator data output system 1b differs from the indicator data output system 1a. The following will give a detailed description of the indicator data output system 1b.

The permanent-open-cabin vehicle 6 of the indicator data output system 1b is identical to the permanent-open-cabin vehicle 6 of the indicator data output system 1a. Therefore, a description thereof is omitted here.

A hardware structure of the portable terminal 4 of the indicator data output system 1b is identical to the hardware structure of the portable terminal 4 of the indicator data output system 1a. However, the storage unit 34 of the indicator data output system 1b stores the permanent-open-cabin vehicle usage amount data table shown in FIG. 12. The permanent-open-cabin vehicle usage amount data table shown in FIG. 12 includes the permanent-open-cabin vehicle usage amount data UD of the permanent-open-cabin vehicle 6.

A hardware structure of the server 2 of the indicator data output system 1b is identical to the hardware structure of the server 2 of the indicator data output system 1a. However, the indicator data storage unit 24 of the indicator data output system 1b stores the indicator data table shown in FIG. 13. In the indicator data table shown in FIG. 13, permanent-open-cabin vehicle identification data ID and indicator data MD are associated with each other.

[Operation of Indicator Data Output System]

Figure 14:
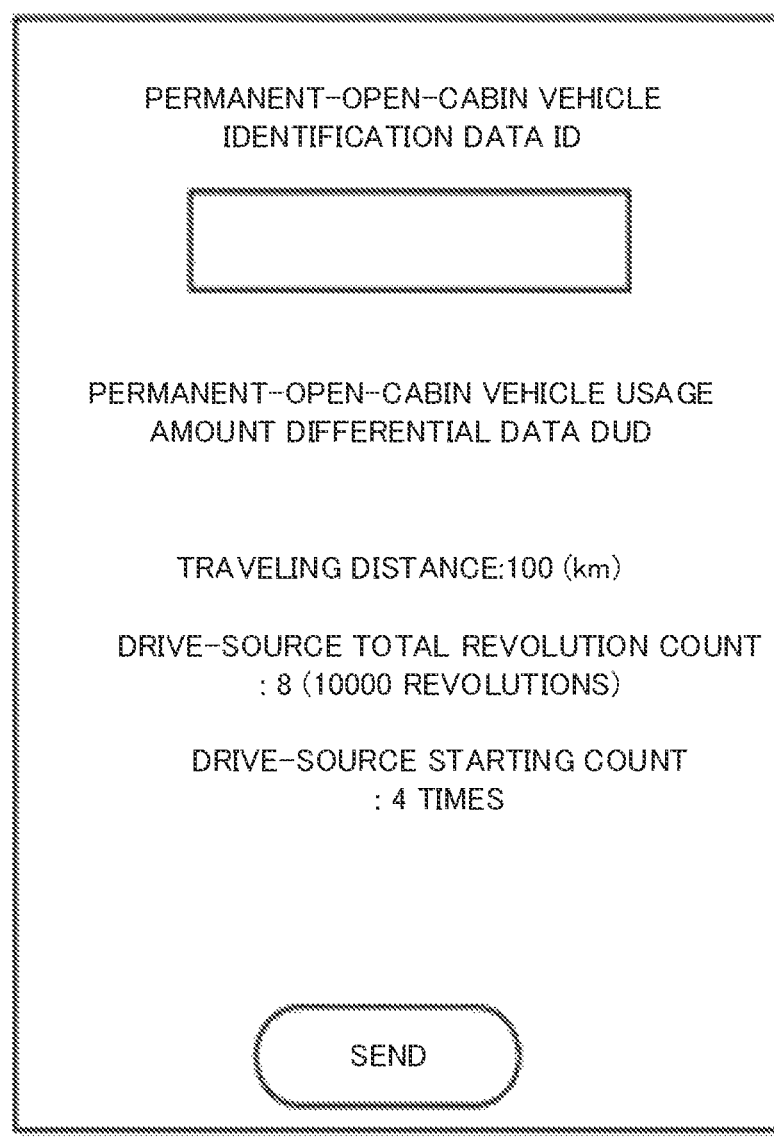
FIG. 14 shows one example of an image displayed on an input/output unit 32.
Figure 15:
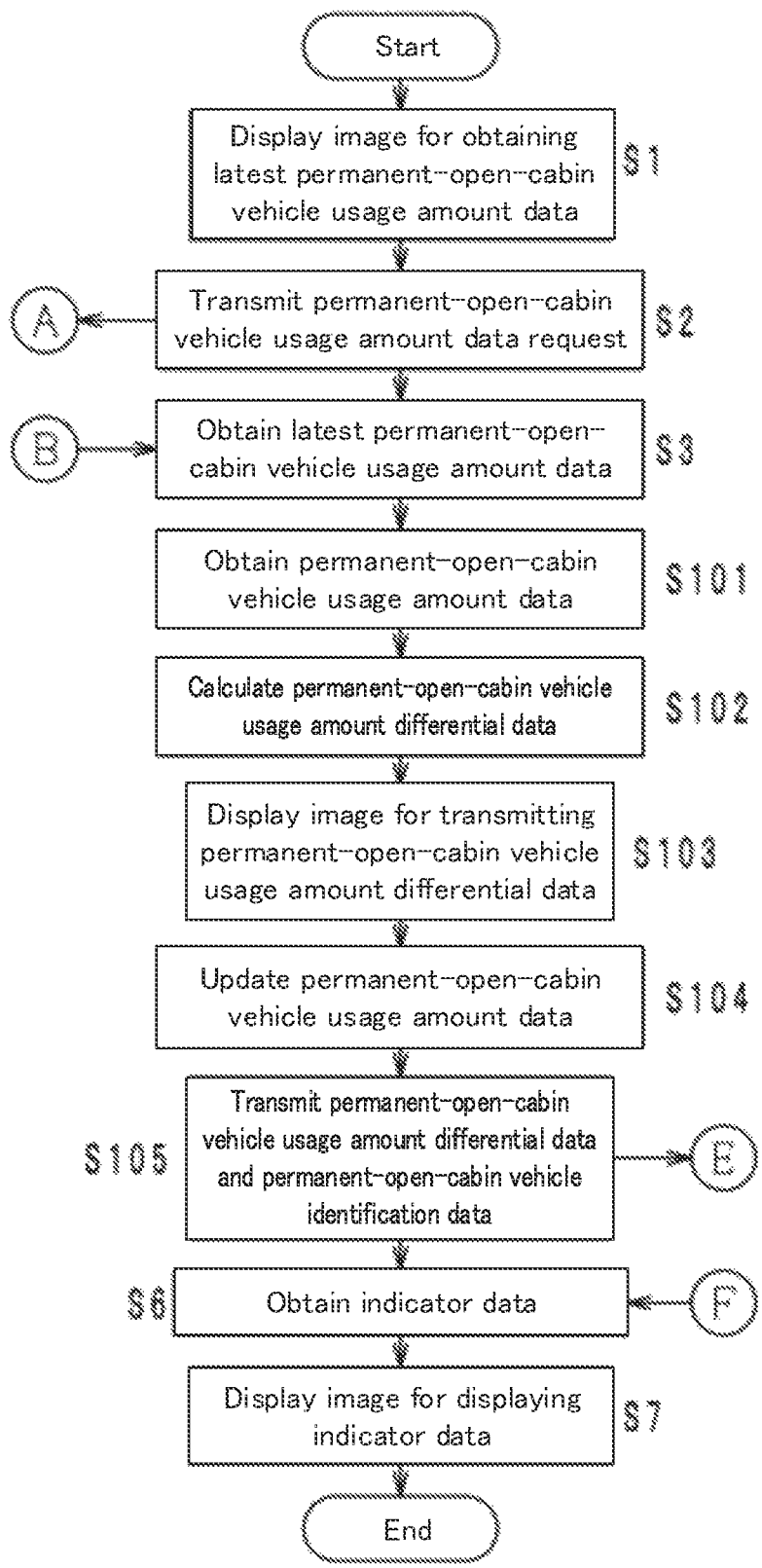
FIG. 15 is a flowchart of operation of a CPU 30 of a portable terminal 4.
Figure 16:
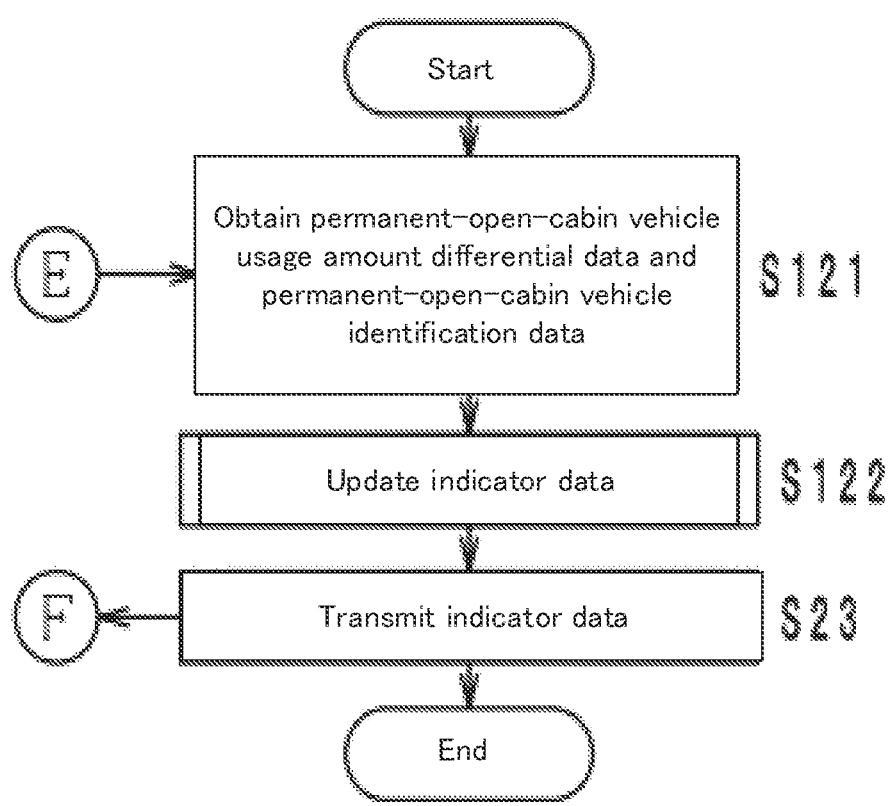
FIG. 16 is a flowchart of operation of a CPU 10 of a server 2.
Figure 17:
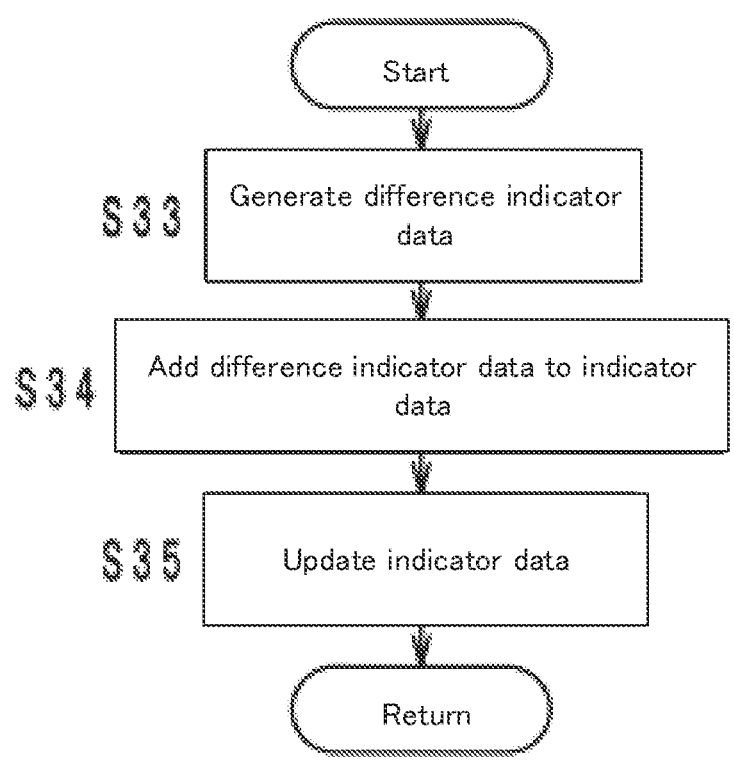
FIG. 17 is a flowchart of a subroutine of step S122 shown in FIG. 16.

Next, with reference to the drawings, the following will describe operation of the indicator data output system 1b. FIG. 14 shows one example of an image displayed on an input/output unit 32. FIG. 15 is a flowchart of operation of a CPU 30 of the portable terminal 4. FIG. 16 is a flowchart of operation of a CPU 10 of the server 2. FIG. 17 is a flowchart of a subroutine of step S122 shown in FIG. 16. For operation of an ECU 40 of the permanent-open-cabin vehicle 6, see FIG. 9.

Steps S1 to S3, S11, and S12 of the indicator data output system 1b are identical to steps S1 to S3, S11, and S12 of the indicator data output system 1a. Therefore, a description thereof is omitted here.

The CPU 30 refers to the permanent-open-cabin vehicle usage amount data table shown in FIG. 12, and obtains the permanent-open-cabin vehicle usage amount data UD (step S101 in FIG. 15). The permanent-open-cabin vehicle usage amount data UD includes a total traveling distance, a drive-source total revolution count, and a drive-source starting count. The total traveling distance is 12564 km. The drive-source total revolution count is 8434873*10000 revolutions. The drive-source starting count is 1056 times.

The CPU 30 calculates permanent-open-cabin vehicle usage amount differential data DUD (step S102 in FIG. 15). The CPU 30 subtracts the permanent-open-cabin vehicle usage amount data UD from the latest permanent-open-cabin vehicle usage amount data NUD. The total traveling distance in the permanent-open-cabin vehicle usage amount differential data DUD is 100 km. The drive-source total revolution count in the permanent-open-cabin vehicle usage amount differential data DUD is 8*10000 revolutions. The drive-source starting count in the permanent-open-cabin vehicle usage amount differential data DUD is 4 times.

The CPU 30 instructs the input/output unit 32 to display an image for transmitting the permanent-open-cabin vehicle usage amount differential data shown in FIG. 14 (step S103 in FIG. 15). In response to this, the input/output unit 32 displays the image for transmitting the permanent-open-cabin vehicle usage amount differential data shown in FIG. 14. A user inputs, as permanent-open-cabin vehicle identification data ID of the permanent-open-cabin vehicle 6, "AAA" to a box in the image for transmitting the latest permanent-open-cabin vehicle identification data via the input/output unit 32. In addition, the user touches a "SEND" button in the image for transmitting the latest permanent-open-cabin vehicle identification data. In response to this, the CPU 30 updates the permanent-open-cabin vehicle usage amount data UD in the permanent-open-cabin vehicle usage amount data table shown in FIG. 12 to the latest permanent-open-cabin vehicle usage amount data NUD (step S104 in FIG. 15). In addition, the CPU 30 instructs a communication unit 38 to transmit the permanent-open-cabin vehicle usage amount differential data DUD and the permanent-open-cabin vehicle identification data ID to the server 2 (step S105 in FIG. 15). The communication unit 38 transmits the permanent-open-cabin vehicle usage amount differential data DUD and the permanent-open-cabin vehicle identification data ID to the server 2.

A permanent-open-cabin vehicle usage amount data-obtaining unit 18 receives the permanent-open-cabin vehicle usage amount differential data DUD and the permanent-open-cabin vehicle identification data ID, and outputs the permanent-open-cabin vehicle usage amount differential data DUD and the permanent-open-cabin vehicle identification data ID to an indicator data-updating unit 16. Consequently, the indicator data-updating unit 16 obtains the permanent-open-cabin vehicle usage amount differential data DUD (one example of the vehicle usage amount data) and the permanent-open-cabin vehicle identification data ID transmitted from the portable terminal 4 (step S121 in FIG. 16). Next, the indicator data-updating unit 16 updates the indicator data MD in the indicator data table stored in the indicator data storage unit 24 (step S122 in FIG. 16).

Steps S33 to S35 of the indicator data output system 1b are identical to steps S33 to S35 of the indicator data output system 1a. Therefore, a description thereof is omitted here. Also, step S23 of the indicator data output system 1b is identical to step S23 of the indicator data output system 1a. Therefore, a description thereof is omitted here. Also, steps S6 and S7 of the indicator data output system 1b are identical to steps S6 and S7 of the indicator data output system 1a. Therefore, a description thereof is omitted here.

Effects

According to the indicator data output system 1b, for the same reasons as for the indicator data output system 1a, it is possible to enable the user to easily grasp an increase in usage amount of the permanent-open-cabin vehicle 6, while suppressing or reducing an increase in data processing load on the server 2.

The permanent-open-cabin vehicle usage amount differential data DUD includes the total traveling distance, the drive-source total revolution count, and the drive-source starting count. The indicator data-updating unit 16 obtains indicator differential data DMD based on the permanent-open-cabin vehicle usage amount differential data DUD. This means that the indicator differential data DMD depends on the total traveling distance, drive-source total revolution count, and drive-source starting count. The indicator data-updating unit 16 updates the indicator data MD based on the indicator differential data DMD. This means that the indicator data MD also depends on the total traveling distance, drive-source total revolution count, and drive-source starting count. Therefore, based on the indicator data MD, the user can grasp increases in the total traveling distance, drive-source total revolution count, and drive-source starting count in a simple manner. Consequently, based on the indicator data MD, the user can grasp a state related to maintenance of components that may be deteriorated along with increases in the total traveling distance, drive-source total revolution count, and drive-source starting count, for example.

Third Embodiment

Next, the following will describe an indicator data output system and an indicator data output method according to a third embodiment.

[Overall Configuration of Indicator Data Output System]

Figure 18:
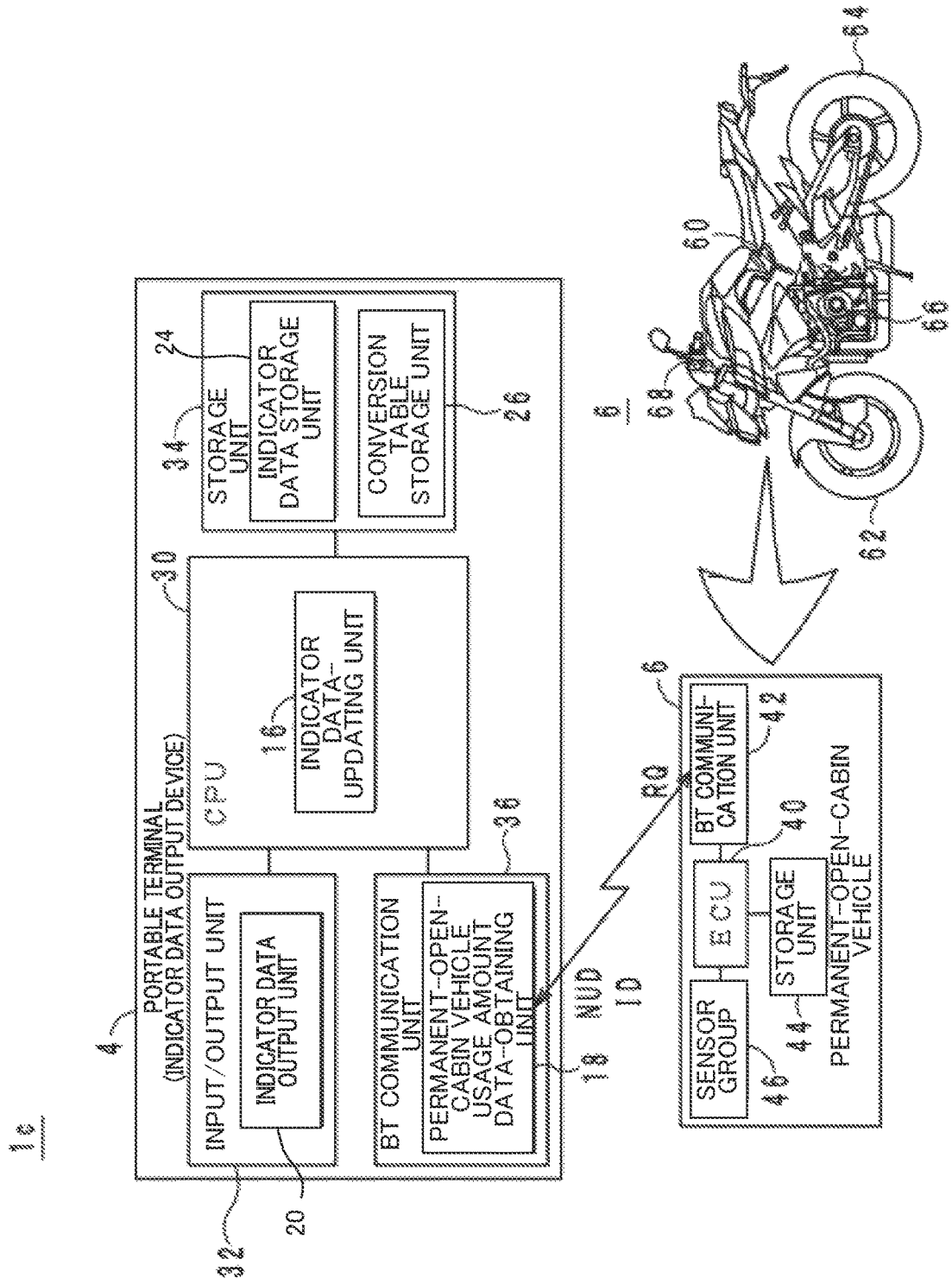
FIG. 18 is a block diagram of an overall configuration of an indicator data output system 1c.

With reference to the drawings, the following will describe an overall configuration of an indicator data output system 1c. FIG. 18 is a block diagram of an overall configuration of the indicator data output system 1c. FIG. 19 shows a latest permanent-open-cabin vehicle usage amount data table.

The following will describe differences between the indicator data output system 1a and the indicator data output system 1c. The indicator data output system 1c does not include a server 2. A portable terminal 4 (one example of the indicator data output device) of the indicator data output device 1c performs the processes that are performed by the server 2 and the portable terminal 4 of the indicator data output system 1a.

A hardware structure of a permanent-open-cabin vehicle 6 of the indicator data output system 1c is identical to the hardware structure of the permanent-open-cabin vehicle 6 of the indicator data output system 1a. However, a storage unit 44 of the indicator data output system 1c stores the latest permanent-open-cabin vehicle usage amount data table shown in FIG. 19. The latest permanent-open-cabin vehicle usage amount data table shown in FIG. 19 includes permanent-open-cabin vehicle identification data ID of the permanent-open-cabin vehicle 6 and latest permanent-open-cabin vehicle usage amount data NUD. The permanent-open-cabin vehicle identification data ID may be a character string having been set by a user or a vehicle identification number preliminarily assigned to the permanent-open-cabin vehicle 6. The permanent-open-cabin vehicle identification data ID may be ID assigned at the time of production of the permanent-open-cabin vehicle 6 or at the time of registration of a production history of the permanent-open-cabin vehicle 6.

The portable terminal 4 may be a tablet terminal in a shop or the like, for example. The portable terminal 4 is communicable with the permanent-open-cabin vehicle 6. As shown in FIG. 18, the portable terminal 4 includes a CPU 30, an input/output unit 32, a storage unit 34, and a BT communication unit 36. The CPU 30 controls operation of the input/output unit 32, the storage unit 34, and the BT communication unit 36. The storage unit 34 stores a program that is to be executed by the CPU 30. The input/output unit 32 serves as an input interface via which a user's input can be accepted, and also serves as a display device for displaying information for the user. The input/output unit 32 may be a display device with a touch panel, for example. The storage unit 34 may be a nonvolatile memory, for example. The BT communication unit 36 communicates with a BT communication unit 42 over a near-field communication network.

The following will give detailed descriptions of configurations in the portable terminal 4. The input/output unit 32 displays an image for obtaining the latest permanent-open-cabin vehicle usage amount data shown in FIG. 3A. When the user touches the START button, the BT communication unit 36 transmits a permanent-open-cabin vehicle usage amount data request RQ to the permanent-open-cabin vehicle 6. The permanent-open-cabin vehicle usage amount data request RQ is data for requesting the latest permanent-open-cabin vehicle usage amount data NUD and the permanent-open-cabin vehicle identification data ID. In response to the permanent-open-cabin vehicle usage amount data request RQ, the BT communication unit 42 transmits the latest permanent-open-cabin vehicle usage amount data NUD and the permanent-open-cabin vehicle identification data ID (see FIG. 19) to the portable terminal 4.

The BT communication unit 36 includes a permanent-open-cabin vehicle usage amount data-obtaining unit 18. The BT communication unit 36 receives the latest permanent-open-cabin vehicle usage amount data NUD and the permanent-open-cabin vehicle identification data ID transmitted from the permanent-open-cabin vehicle 6. Consequently, the permanent-open-cabin vehicle usage amount data-obtaining unit 18 obtains the latest permanent-open-cabin vehicle usage amount data NUD and the permanent-open-cabin vehicle identification data ID.

The storage unit 34 includes an indicator data storage unit 24 and a conversion table storage unit 26. The indicator data storage unit 24 stores permanent-open-cabin vehicle identification data ID, indicator data MD, and permanent-open-cabin vehicle usage amount data UD in association with each other. For this, the indicator data storage unit 24 stores the indicator data table shown in FIG. 5. The permanent-open-cabin vehicle identification data ID, the indicator data MD, the permanent-open-cabin vehicle usage amount data UD, and the indicator data table of the indicator data output system 1c are identical to the permanent-open-cabin vehicle identification data ID, the indicator data MD, the permanent-open-cabin vehicle usage amount data UD, and the indicator data table of the indicator data output system 1a. Therefore, a description thereof is omitted here.

The conversion table storage unit 26 stores the conversion table shown in FIG. 6. The conversion table of the indicator data output system 1c is identical to the conversion table of the indicator data output system 1a. Therefore, a description thereof is omitted here.

The CPU 30 includes an indicator data-updating unit 16. The indicator data-updating unit 16 updates the indicator data MD stored in the indicator data storage unit 24.

The input/output unit 32 further includes an indicator data output unit 20. The indicator data output unit 20 outputs the indicator data MD stored in the indicator data storage unit 24. More specifically, the input/output unit 32 displays an image for displaying the indicator data shown in FIG. 7. The image for displaying the indicator data shown in FIG. 7 includes the indicator data MD of the permanent-open-cabin vehicle 6. This enables the user to see the indicator data MD of the permanent-open-cabin vehicle 6.

[Operation of Indicator Data Output System]

Figure 20:
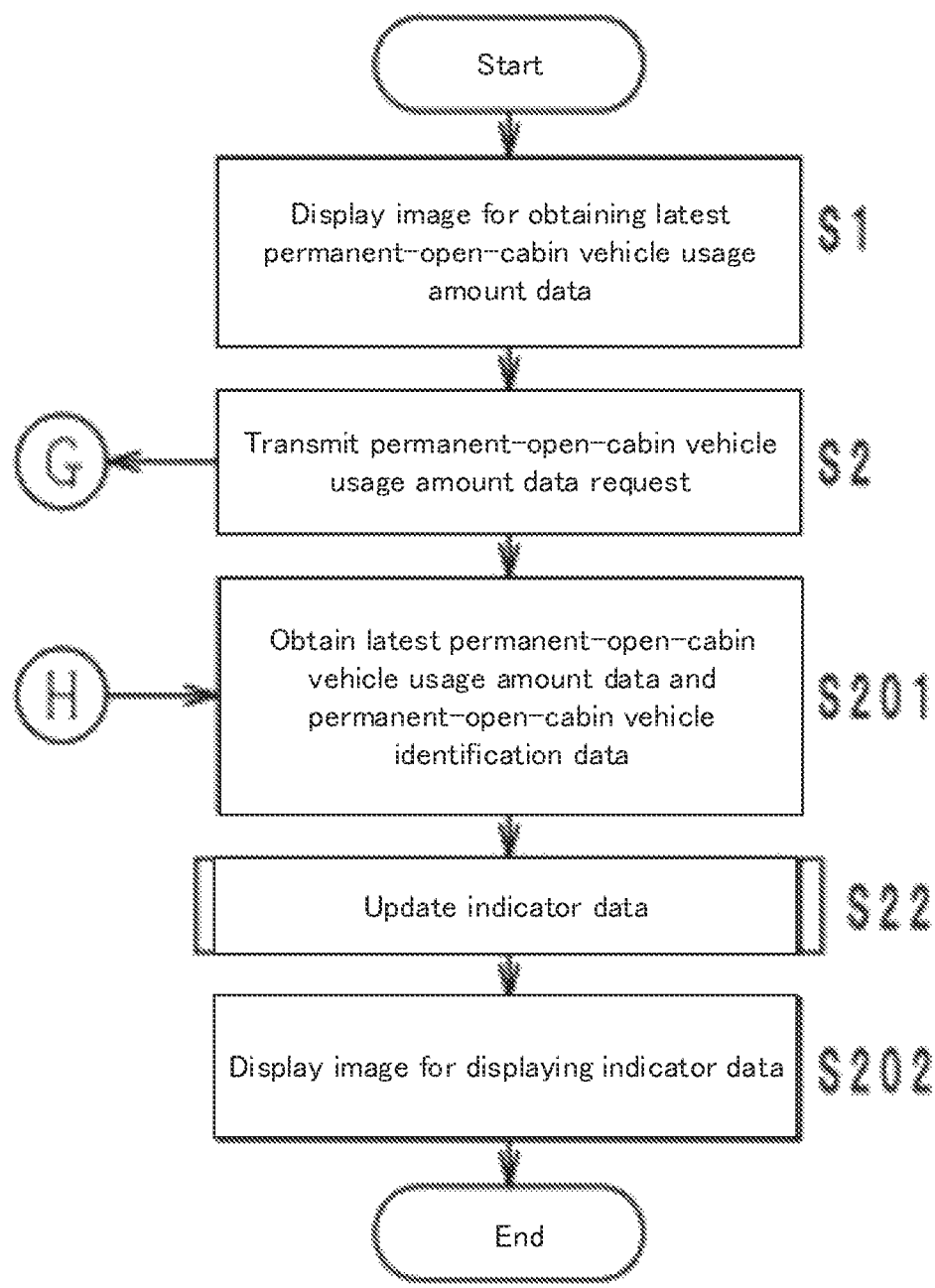
FIG. 20 is a flowchart of operation of a CPU 30 of a portable terminal 4.
Figure 21:
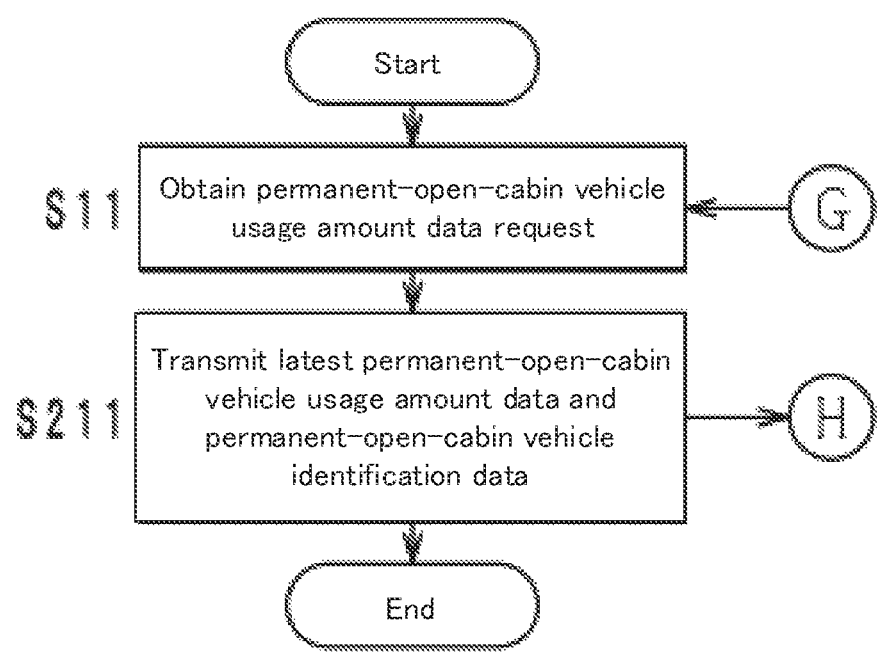
FIG. 21 is a flowchart of operation of an ECU 40 of a permanent-open-cabin vehicle 6.

Next, with reference to the drawings, the following will describe operation of the indicator data output system 1c. FIG. 20 is a flowchart of operation of the CPU 30 of the portable terminal 4. FIG. 21 is a flowchart of operation of an ECU 40 of the permanent-open-cabin vehicle 6. For a flowchart of a subroutine of step S22 shown in FIG. 20, see FIG. 11.

Steps S1, S2, and S11 of the indicator data output system 1c are identical to steps S1, S2, and S11 of the indicator data output system 1a. Therefore, a description thereof is omitted here.

After step S11, the ECU 40 refers to the latest permanent-open-cabin vehicle usage amount data table (see FIG. 19), and obtains the latest permanent-open-cabin vehicle usage amount data NUD and the permanent-open-cabin vehicle identification data ID. The latest permanent-open-cabin vehicle usage amount data NUD includes a total traveling distance, a drive-source total revolution count, and a drive-source starting count. The total traveling distance is 12664 km. The drive-source total revolution count is 8434881*10000 revolutions. The drive-source starting count is 1060 times. The permanent-open-cabin vehicle identification data ID is "AAA". Thereafter, the ECU 40 instructs the BT communication unit 42 to transmit the latest permanent-open-cabin vehicle usage amount data NUD and the permanent-open-cabin vehicle identification data ID to the portable terminal 4 (step S211 in FIG. 21). The BT communication unit 42 transmits the latest permanent-open-cabin vehicle usage amount data NUD and the permanent-open-cabin vehicle identification data ID to the portable terminal 4.

The permanent-open-cabin vehicle usage amount data-obtaining unit 18 receives (obtains) the latest permanent-open-cabin vehicle usage amount data NUD and the permanent-open-cabin vehicle identification data ID, and outputs the latest permanent-open-cabin vehicle usage amount data NUD and the permanent-open-cabin vehicle identification data ID to the CPU 30. Consequently, the CPU 30 obtains the latest permanent-open-cabin vehicle usage amount data NUD and the permanent-open-cabin vehicle identification data ID (step S201 in FIG. 20).

The indicator data-updating unit 16 updates the indicator data MD in the indicator data table shown in FIG. 5 (step S22 in FIG. 20). Step S22 of the indicator data output system 1c is identical to step S22 of the indicator data output system 1a. Therefore, a description thereof is omitted here.

Based on the new indicator data MD updated in step S35 (see FIG. 11), the CPU 30 instructs the input/output unit 32 to display an image for displaying the indicator data shown in FIG. 7 (step S202 in FIG. 20). In response to this, the input/output unit 32 displays the image for displaying the indicator data shown in FIG. 7. This enables the user to see the indicator data MD of the permanent-open-cabin vehicle 6.

Effects

According to the indicator data output system 1c, for the same reasons as for the indicator data output system 1a, it is possible to enable the user to grasp an increase in usage amount of the permanent-open-cabin vehicle 6 in a simple manner, while suppressing or reducing an increase in data processing load on the portable terminal 4.

In addition, according to the indicator data output system 1c, for the same reasons as for the indicator data output system 1a, the user can grasp increases in the total traveling distance, drive-source total revolution count, and drive-source starting count in a simple manner based on the indicator data MD.

Other Embodiments

The embodiments and variations thereof described herein and/or shown in the drawings are given to facilitate understanding of the present teaching, and do not limit the idea of the present teaching. The embodiments and variations thereof can be modified and/or improved within the scope of the gist of the present teaching.

The gist may encompass equivalent elements, modifications, deletions, combinations (e.g., combinations of features of different embodiments and/or variations), improvements, and changes that can be understood by persons skilled in the art based on the embodiments disclosed herein. The limitations recited in the claims should be widely understood based on the terms recited in the claims, and should not be limited to the embodiments and variations thereof described during prosecution of Description or the present application. Such embodiments and variations should be construed as nonexclusive. For example, the expressions "preferable" and "suitable" herein have nonexclusive meanings, and means that "preferable but not limitative" and "suitable but not limitative".

In the indicator data output system 1, 1a, 1b, 1c, the permanent-open-cabin vehicle 6 may be replaced with a vehicle. The vehicle is a concept encompassing the permanent-open-cabin vehicle 6. The vehicle also encompasses a four-wheeled motor vehicle permitted to drive on a public road. The vehicle further encompasses a vehicle with a roof undetachably provided for a driver's seat. Thus, the vehicle encompasses an aircraft with a roof, a ship with a roof, and a helicopter with a roof. The vehicle may drive autonomously or may be remote-operated.

The vehicle may not have a cabin in which a driver and/or a passenger can ride. Such a type of vehicle may be an autonomous-driving work vehicle or a remote-operated work vehicle, for example. The autonomous-driving work vehicle is a vehicle designed to drive autonomously to perform an agricultural work, a construction work, a civil engineering work, and/or the like. The remote-operated work vehicle is a vehicle designed to be remote-operated to perform an agricultural work, a construction work, a civil engineering work, and/or the like.

In a case where a helicopter is employed as the vehicle, the drive source 66 may be an engine or a motor. In this case, the drive source 66 of the helicopter rotates a rotor. In a case where a ship is employed as the vehicle, the drive source 66 may be an engine, a motor, or a pump-jet. In this case, the engine or motor serving as the drive source 66 of the ship rotates a helix screw. In a case where an aircraft is employed as the vehicle, the drive source 66 may be an engine (including a jet engine) or a motor. In this case, the jet engine serving as the drive source 66 of the aircraft rotates a turbine. The engine or motor serving as the drive source 66 of the aircraft rotates a propeller.

In the indicator data output system 1a, 1b, 1c, the permanent-open-cabin vehicle usage amount data UD includes the total traveling distance, the drive-source total revolution count, and the drive-source starting count. However, the permanent-open-cabin vehicle usage amount data UD may include another information indicating a usage amount of the permanent-open-cabin vehicle 6, in addition to the total traveling distance, the drive-source total revolution count, and the drive-source starting count. Thus, the permanent-open-cabin vehicle usage amount data UD may include at least one indicator indicating the number of times that a time derivative value of the number of revolutions of the drive source 66 of the permanent-open-cabin vehicle 6 has exceeded a predetermined value, the number of times that the time derivative value of the number of revolutions of the drive source 66 of the permanent-open-cabin vehicle 6 has fallen below the predetermined value, the number of rotations of a tire, the number of times that a time derivative value of the number of rotations of a tire has exceeded a predetermined value, the number of times that the time derivative value of the number of rotations of a tire has fallen below the predetermined value, a time integral value of the number of rotations of a tire, the number of rotations of a rotor, the number of times that a time derivative value of the number of rotations of a rotor has exceeded a predetermined value, the number of times that the time derivative value of the number of rotations of a rotor has fallen below the predetermined value, a time integral value of the number of rotations of a rotor, the number of rotations of a helix screw, the number of times that a time derivative value of the number of rotations of a helix screw has exceeded a predetermined value, the number of times that the time derivative value of the number of rotations of a helix screw has fallen below the predetermined value, a time integral value of the number of rotations of a helix screw, the number of rotations of a turbine, the number of times that a time derivative value of the number of rotations of a turbine has exceeded a predetermined value, the number of times that the time derivative value of the number of rotations of a turbine has fallen below the predetermined value, a time integral value of the number of rotations of a turbine, the number of rotations of a propeller, the number of times that a time derivative value of the number of rotations of a propeller has exceeded a predetermined value, the number of times that the time derivative value of the number of rotations of a propeller has fallen below the predetermined value, a time integral value of the number of rotations of a propeller, the number of times that a coolant temperature or an oil temperature of the engine of the permanent-open-cabin vehicle 6 has exceeded a predetermined temperature, the number of times that the coolant temperature or the oil temperature of the engine of the permanent-open-cabin vehicle 6 has fallen below the predetermined temperature, a time integral value of the coolant temperature or the oil temperature of the engine of the permanent-open-cabin vehicle a battery current, a time integral value of the battery current, the number of times that a time derivative value of the battery current has exceeded a predetermined value, the number of times that the time derivative value of the battery current has fallen below the predetermined value, a battery voltage, the number of times that a time derivative value of a value obtained by dividing the battery current by the battery voltage has exceeded a predetermined value, or the number of times that the time derivative value of the value obtained by dividing the battery current by the battery voltage has fallen below the predetermined value. The permanent-open-cabin vehicle usage amount data UD is not limited to the indicators exemplified above. The permanent-open-cabin vehicle usage amount data UD only needs to be an indicator that increases as the permanent-open-cabin vehicle 6 is used and that enhances the necessity for maintenance of the permanent-open-cabin vehicle 6 as the permanent-open-cabin vehicle usage amount data UD increases.

The sensor group 46 of the permanent-open-cabin vehicle 6 may include a front-wheel rotation sensor in place of the rear-wheel rotation sensor. The front-wheel rotation sensor is configured to count the number of rotations of the front wheel 62. The sensor group 46 may include both the front-wheel rotation sensor and the rear-wheel rotation sensor.

The sensor group 46 of the permanent-open-cabin vehicle 6 may further include another sensor in addition to the rear-wheel rotation sensor, the drive-source revolution sensor, and the drive-source start sensor. The sensor group 46 of the permanent-open-cabin vehicle 6 may include a vehicle speed sensor, an accelerator sensor, a coolant temperature sensor of the engine, an oil temperature sensor of the engine, an ammeter of the battery, and a voltmeter of the batter, for example.

In the indicator data output system 1, 1a, 1b, 1c, the user may check latest permanent-open-cabin vehicle usage amount data NUD on a meter panel of the permanent-open-cabin vehicle 6, and may input the latest permanent-open-cabin vehicle usage amount data NUD via the input/output unit 32. In this case, the portable terminal 4 does not have to obtain the latest permanent-open-cabin vehicle usage amount data NUD via the BT communication unit 36. In the indicator data output system 1c, in a case where the user inputs the latest permanent-open-cabin vehicle usage amount data NUD via the input/output unit 32, the input/output unit 32 functions as the permanent-open-cabin vehicle usage amount data-obtaining unit 18.

In the indicator data output system 1c, the user may input the permanent-open-cabin vehicle identification data ID via the input/output unit 32. In this case, the portable terminal 4 does not have to obtain the permanent-open-cabin vehicle identification data ID via the BT communication unit 36.

In the indicator data output system 1a, the user may input the permanent-open-cabin vehicle identification data ID and the latest permanent-open-cabin vehicle usage amount data NUD via an input/output unit (not shown) of the server 2. The input/output unit may be a mouse and a keyboard, for example. In this case, the input/output unit functions as the permanent-open-cabin vehicle usage amount data-obtaining unit 18.

In the indicator data output system 1, 1a, 1b, the indicator data output unit 20 may output the indicator data ID to the outside of the server 2. Similarly, in the indicator data output system 1c, the indicator data output unit 20 may output the indicator data ID to the outside of the portable terminal 4. Thus, the indicator data ID may be outputted by an electric signal, an image, sound, or a combination thereof.

In the indicator data output system 1, 1a, 1b, 1c, the portable terminal 4 may be fixed to the permanent-open-cabin vehicle 6. That is, the portable terminal 4 may be an on-board terminal of the permanent-open-cabin vehicle 6. In this case, the ECU 40 is integrated with the CPU 30, and the BT communication units 36 and 42 are no longer necessary. The portable terminal 4 may be detachable from the permanent-open-cabin vehicle 6, or may be undetachable from the permanent-open-cabin vehicle 6.

When the permanent-open-cabin vehicle 6 is subjected to maintenance, the indicator data output system 1, 1a, 1b, 1c may reset the indicator data MD to zero or may devalue the indicator data MD. When the permanent-open-cabin vehicle 6 is subjected to maintenance, the indicator data output system 1, 1a, 1b, 1c may reset a maintenance-related indicator of the latest permanent-open-cabin vehicle usage amount data NUD or the permanent-open-cabin vehicle usage amount data UD to zero, or may devalue the maintenance-related indicator.

The indicator data MD may be data indicating an indicator exchangeable with a service related to maintenance of the permanent-open-cabin vehicle 6. The service related to maintenance of the permanent-open-cabin vehicle 6 may be purchasing or replacement of a consumable article of the permanent-open-cabin vehicle 6. When the indicator data MD is replaced with the service related to maintenance of the permanent-open-cabin vehicle 6, the indicator data MD devalues. The indicator data MD may be replaced with a service or an article that is not maintenance of the permanent-open-cabin vehicle 6. When the indicator data MD is replaced with a service or an article that is not maintenance of the permanent-open-cabin vehicle 6, the indicator data MD devalues.

The permanent-open-cabin vehicle usage amount data UD stored in the indicator data storage unit 24 may be permanent-open-cabin vehicle usage amount data UD upon the most recent maintenance of the permanent-open-cabin vehicle 6. That is, the permanent-open-cabin vehicle usage amount data UD stored in the indicator data storage unit 24 may be the latest permanent-open-cabin vehicle usage amount data NUD upon the most recent maintenance of the permanent-open-cabin vehicle 6. With this configuration, when the permanent-open-cabin vehicle 6 is subjected to maintenance, the permanent-open-cabin vehicle usage amount data UD is updated. That is, when the permanent-open-cabin vehicle 6 is subjected to maintenance, the indicator data MD is also updated. For example, in a case where the indicator data MD is an indicator exchangeable with a service related to maintenance of the permanent-open-cabin vehicle 6 or an indicator exchangeable with a service or an article that is not maintenance of the permanent-open-cabin vehicle 6, the above configuration can promote the user to go to a shop engaged in maintenance of the permanent-open-cabin vehicle 6 in order to update the indicator data MD.

In addition, in a case where the permanent-open-cabin vehicle usage amount data UD stored in the indicator data storage unit 24 is the permanent-open-cabin vehicle usage amount data UD upon the most recent maintenance of the permanent-open-cabin vehicle 6, an upper limit value may be set to the permanent-open-cabin vehicle usage amount differential data DUD. Specifically, in a case where the permanent-open-cabin vehicle usage amount differential data DUD is higher than the permanent-open-cabin vehicle usage amount differential data upper limit value (one example of the vehicle usage amount differential data upper limit value), the indicator data-updating unit 16 updates the permanent-open-cabin vehicle usage amount differential data DUD as the permanent-open-cabin vehicle usage amount differential data upper limit value. This configuration can make the user go to the shop engaged in maintenance of the permanent-open-cabin vehicle 6 in order to update the indicator data MD, before the permanent-open-cabin vehicle usage amount differential data DUD reaches the permanent-open-cabin vehicle usage amount differential data upper limit value. As for the total traveling distance, the permanent-open-cabin vehicle usage amount differential data upper limit value is 3000 km, for example. The permanent-open-cabin vehicle usage amount differential data upper limit value may be set to coincide with an oil replacement cycle, for example.

The indicator data-updating unit 16 may obtain permanent-open-cabin vehicle usage amount differential data DUD that increases over a permanent-open-cabin vehicle usage amount differential data effective period (one example of the vehicle usage amount differential data effective period). The permanent-open-cabin vehicle usage amount differential data effective period may be a predetermined period of time elapsed since the most recent maintenance of the permanent-open-cabin vehicle 6, for example. Alternatively, the permanent-open-cabin vehicle usage amount differential data effective period may be a predetermined period of time from the past to the present, for example. The length of the permanent-open-cabin vehicle usage amount differential data effective period may be arbitrarily set, and may be one year or three months, for example.

The indicator data MD stored in the indicator data storage unit 24 may be indicator data MD upon the most recent maintenance of the permanent-open-cabin vehicle 6. With this configuration, when the permanent-open-cabin vehicle 6 is subjected to maintenance, the indicator data MD is updated. For example, in a case where the indicator data MD is an indicator exchangeable with a service related to maintenance of the permanent-open-cabin vehicle 6 or an indicator exchangeable with a service or an article not related to maintenance of the permanent-open-cabin vehicle 6, the above configuration can promote the user to go to a shop engaged in maintenance of the permanent-open-cabin vehicle 6 in order to update the indicator data MD.

In addition, in a case where the indicator data MD stored in the indicator data storage unit 24 is the indicator data MD upon the most recent maintenance of the permanent-open-cabin vehicle 6, an upper limit value may be set to the indicator differential data DMD. Specifically, in a case where the indicator differential data DMD is higher than the indicator differential data upper limit value, the indicator data-updating unit 16 updates the indicator differential data upper limit value to be the indicator differential data DMD. This configuration can make the user go to the shop engaged in maintenance of the permanent-open-cabin vehicle 6 in order to update the indicator data MD, before the indicator differential data DMD reaches the indicator differential data upper limit value.

In addition, the indicator data-updating unit 16 may obtain the indicator differential data DMD that increases over an indicator differential data effective period. The indicator differential data effective period may be a predetermined period of time elapsed since the most recent maintenance of the permanent-open-cabin vehicle 6, for example. Alternatively, the indicator differential data effective period may be a predetermined period of time from the past to the present, for example. The length of the indicator differential data effective period may be arbitrarily set, and may be one year or three months, for example.

The timing at which the indicator data-updating unit 16 updates the indicator data MD is not limited to the above-described timing. For example, the indicator data-updating unit 16 may update the indicator data MD stored in the indicator data storage unit 24 at a timing when the user of the permanent-open-cabin vehicle 6 comes to a shop engaged in maintenance of the permanent-open-cabin vehicle 6. For example, when the user comes to the shop engaged in maintenance of the permanent-open-cabin vehicle 6, the user operates a terminal in the shop to update the indicator data MD. This configuration can make the user go to the shop engaged in maintenance of the permanent-open-cabin vehicle 6 in order to update the indicator data MD.

For the indicator data MD, an expiration date may be set. In this case, when an indicator data effective period has elapsed after updating of the indicator data MD, the indicator data-updating unit 16 devalues the indicator data MD. When the indicator data effective period has elapsed after updating of the indicator data MD, the indicator data-updating unit 16 may set the indicator data MD to zero.

Alternatively, the indicator data-updating unit 16 may update the indicator data MD every time the latest permanent-open-cabin vehicle usage amount data NUD changes.

In the indicator data table shown in FIG. 5, the permanent-open-cabin vehicle identification data ID and the indicator data MD are associated with each other. In the indicator data table shown in FIG. 5, the user of the permanent-open-cabin vehicle 6 and the permanent-open-cabin vehicle identification data ID may be associated with each other.

The permanent-open-cabin vehicle 6 may be provided with an indicator data output device having a function equivalent to that of the server 2.

The conversion table storage unit 26 may store a map in place of the conversion table shown in FIG. 6. The map represents a relation between the permanent-open-cabin vehicle usage amount differential data DUD and the indicator differential data DMD. In place of the conversion table shown in FIG. 6, a formula may be used. In this case, the program that is to be executed by the indicator data-updating unit 16 includes a formula used to calculate the indicator differential data DMD based on the permanent-open-cabin vehicle usage amount differential data DUD.

REFERENCE SIGNS LIST

1, 1a, 1b, 1c: indicator data output system
2: server
2x: indicator data output device
4: portable terminal
6: permanent-open-cabin vehicle
10, 30: CPU
12, 38: communication unit
14, 34, 44: storage unit
16: indicator data-updating unit
18: permanent-open-cabin vehicle usage amount data-obtaining unit
20: indicator data output unit
24: indicator data storage unit 26: conversion table storage unit
32: input/output unit
36, 42: BT communication unit
40: ECU
46: sensor group
DMD: indicator differential data
DUD: permanent-open-cabin vehicle usage amount differential data
MD: indicator data
NUD: latest permanent-open-cabin vehicle usage amount data
RQ: permanent-open-cabin vehicle usage amount data request
RT: rate
UD: permanent-open-cabin vehicle usage amount data

The invention claimed is:

1. An indicator data output device, comprising:
an indicator data storage unit configured to store vehicle identification data and indicator data in association with each other, wherein
the vehicle identification data is data by which a vehicle is identifiable, and
the indicator data includes a dimensionless indicator, which is dimensionless with respect to all of a plurality of vehicle status dimensions;
an indicator data output unit configured to output the indicator data stored in the indicator data storage unit;
a vehicle usage amount data-obtaining unit configured to obtain the vehicle identification data and vehicle usage amount data indicating a usage amount of the vehicle identified by the vehicle identification data, wherein
the vehicle usage amount data includes at least one of
a first indicator, which is a dimensional quantity with respect to at least one of the plurality of vehicle status dimensions, and
a second indicator indicating a number of times of a third indicator satisfying a predetermined condition, the third indicator being another dimensional quantity with respect to at least one of the plurality of vehicle status dimensions, the second indicator being dimensionless with respect to all of the plurality of vehicle status dimensions,
the first indicator and the second indicator increasing as the vehicle is used; and
an indicator data-updating unit configured to
obtain indicator differential data of the vehicle based on the vehicle identification data and the vehicle usage amount data obtained by the vehicle usage amount data-obtaining unit, for the vehicle identified by the vehicle identification data, the indicator differential data corresponding to an amount of increase in the indicator data calculated based on the vehicle usage amount data, the indicator data increasing as the vehicle usage amount data increases, and
update, based on the indicator differential data, the indicator data stored in the indicator data storage unit, for the vehicle identified by the vehicle identification data, wherein
the plurality of vehicle status dimensions include
a length-related dimension,
a mass-related dimension,
a time-related dimension,
an electric current-related dimension,
a thermodynamic temperature-related dimension,
a substance amount-related dimension, and
a luminosity-related dimension.

2. The indicator data output device according to claim 1, wherein
the vehicle usage amount data includes two or more indicators.

3. The indicator data output device according to claim 1, wherein the first or second indicator indicates one of
a total traveling distance of the vehicle,
a total number of revolutions of a drive source of the vehicle,
a number of times of starting the drive source of the vehicle,
a number of times that a time derivative value of the number of revolutions of the drive source of the vehicle has exceeded a first predetermined value,
a number of times that the time derivative value of the number of revolutions of the drive source of the vehicle has fallen below the first predetermined value,
a number of rotations of a tire,
a number of times that a time derivative value of the number of rotations of the tire has exceeded a second predetermined value,
a number of times that the time derivative value of the number of rotations of the tire has fallen below the second predetermined value,
a time integral value of the number of rotations of the tire,
a number of rotations of a rotor,
a number of times that a time derivative value of the number of rotations of the rotor has exceeded a third predetermined value,
a number of times that the time derivative value of the number of rotations of the rotor has fallen below the third predetermined value,
a time integral value of the number of rotations of the rotor,
a number of rotations of a helix screw,
a number of times that a time derivative value of the number of rotations of the helix screw has exceeded a fourth predetermined value,
a number of times that the time derivative value of the number of rotations of the helix screw has fallen below the fourth predetermined value,
a time integral value of the number of rotations of the helix screw,
a number of rotations of a turbine,
a number of times that a time derivative value of the number of rotations of the turbine has exceeded a fifth predetermined value,
a number of times that the time derivative value of the number of rotations of the turbine has fallen below the fifth predetermined value,
a time integral value of the number of rotations of the turbine,
a number of rotations of a propeller,
a number of times that a time derivative value of the number of rotations of the propeller has exceeded a sixth predetermined value,
a number of times that the time derivative value of the number of rotations of the propeller has fallen below the sixth predetermined value,
a time integral value of the number of rotations of the propeller,
a number of times that a coolant temperature or an oil temperature of an engine of the vehicle has exceeded a predetermined temperature,
a number of times that the coolant temperature or the oil temperature of the engine of the vehicle has fallen below the predetermined temperature, a time integral value of the coolant temperature or the oil temperature of the engine of the vehicle,
a battery current,
a time integral value of the battery current,
a number of times that a time derivative value of the battery current has exceeded a seventh predetermined value,
a number of times that the time derivative value of the battery current has fallen below the seventh predetermined value,
a battery voltage,
a number of times that a time derivative value of a value obtained by dividing the battery current by the battery voltage has exceeded an eighth predetermined value, or
a number of times that the time derivative value of the value obtained by dividing the battery current by the battery voltage has fallen below the eighth predetermined value.

4. The indicator data output device according to claim 1, wherein
the indicator data storage unit stores the vehicle identification data, the indicator data, and the vehicle usage amount data in association with each other,
the vehicle usage amount data-obtaining unit obtains, as the vehicle usage amount data, latest vehicle usage amount data,
the indicator data-updating unit is further configured to calculate vehicle usage amount differential data by subtracting the vehicle usage amount data stored in the indicator data storage unit from the latest vehicle usage amount data obtained by the vehicle usage amount data-obtaining unit, and
the indicator data-updating unit obtains the indicator differential data based on the vehicle usage amount differential data.

5. The indicator data output device according to claim 4, wherein
the vehicle usage amount data stored in the indicator data storage unit is vehicle usage amount data upon most recent maintenance of the vehicle.

6. The indicator data output device according to claim 5, wherein
in a case where the vehicle usage amount differential data is higher than a vehicle usage amount differential data upper limit value, the indicator data-updating unit uses the vehicle usage amount differential data upper limit value to update the vehicle usage amount differential data.

7. The indicator data output device according to claim 1, wherein
the indicator data stored in the indicator data storage unit is indicator data upon most recent maintenance of the vehicle.

8. The indicator data output device according to claim 7, wherein
in a case where the indicator differential data is higher than an indicator differential data upper limit value, the indicator data-updating unit uses the indicator differential data upper limit value to update the indicator differential data.

9. The indicator data output device according to claim 4, wherein
the indicator data-updating unit obtains the vehicle usage amount differential data that increases over a vehicle usage amount differential data effective period.

10. The indicator data output device according to claim 1, wherein
the indicator data-updating unit obtains the indicator differential data that increases over an indicator differential data effective period.

11. The indicator data output device according to claim 1, wherein
the indicator data-updating unit updates the indicator data stored in the indicator data storage unit at a time when a user of the vehicle comes to a shop engaged in maintenance of the vehicle.

12. The indicator data output device according to claim 1, wherein
the indicator data-updating unit is further configured to devalue the indicator data when an indicator data effective period has elapsed after updating of the indicator data.

13. The indicator data output device according to claim 1, wherein
the vehicle usage amount data-obtaining unit obtains, by radio communication, the vehicle identification data and the vehicle usage amount data indicating the usage amount of the vehicle, the vehicle being identified by the vehicle identification data.

14. An indicator data output method that is to be executed by an indicator data output device including an indicator data storage unit, the indicator data storage unit being configured to store vehicle identification data and indicator data in association with each other, wherein
the vehicle identification data is data by which a vehicle is identifiable,
the indicator data includes a dimensionless indicator, which is dimensionless with respect to all of a plurality of vehicle status dimensions, and
the plurality of vehicle status dimensions include
a length-related dimension,
a mass-related dimension,
a time-related dimension,
an electric current-related dimension,
a thermodynamic temperature-related dimension,
a substance amount-related dimension, and
a luminosity-related dimension,
the method comprising:
a vehicle usage amount data-obtaining step of obtaining the vehicle identification data and vehicle usage amount data indicating a usage amount of the vehicle identified by the vehicle identification data, the vehicle usage amount data including at least one of
a first indicator which is a dimensional quantity with respect to at least one of the plurality of vehicle status dimensions, and
a second indicator indicating a number of times of a third indicator satisfying a predetermined condition, the third indicator being another dimensional quantity with respect to at least one of the plurality of vehicle status dimensions, the second indicator being dimensionless with respect to all of the plurality of vehicle status dimensions,
the first indicator and the second indicator increasing as the vehicle is used;
an indicator data-updating step of
obtaining indicator differential data of the vehicle based on the vehicle usage amount data and the vehicle identification data obtained in the vehicle usage amount data-obtaining step, the vehicle being identified by the vehicle identification data, the indicator differential data corresponding to an amount of increase in the indicator data, calculated based on the vehicle usage amount data, and updating the indicator data of the vehicle stored in the indicator data storage unit based on the indicator differential data, for the vehicle identified by the vehicle identification data obtained in the vehicle usage amount data-obtaining step, the indicator data increasing as the vehicle usage amount data increases; and an indicator data output step of outputting the indicator data stored in the indicator data storage unit.

15. The indicator data output method according to claim 14, wherein
the vehicle usage amount data includes two or more indicators.

16. The indicator data output method according to claim 14, wherein the first or second indicator indicates one of
a total traveling distance of the vehicle,
a total number of revolutions of a drive source of the vehicle,
a number of times of starting the drive source of the vehicle,
a number of times that a time derivative value of the number of revolutions of the drive source of the vehicle has exceeded a first predetermined value,
a number of times that the time derivative value of the number of revolutions of the drive source of the vehicle has fallen below the first predetermined value,
a number of rotations of a tire,
a number of times that a time derivative value of the number of rotations of the tire has exceeded a second predetermined value,
a number of times that the time derivative value of the number of rotations of the tire has fallen below the second predetermined value,
a time integral value of the number of rotations of the tire,
a number of rotations of a rotor,
a number of times that a time derivative value of the number of rotations of the rotor has exceeded a third predetermined value,
a number of times that the time derivative value of the number of rotations of the rotor has fallen below the third predetermined value,
a time integral value of the number of rotations of the rotor,
a number of rotations of a helix screw,
a number of times that a time derivative value of the number of rotations of the helix screw has exceeded a fourth predetermined value,
a number of times that the time derivative value of the number of rotations of the helix screw has fallen below the fourth predetermined value,
a time integral value of the number of rotations of the helix screw,
a number of rotations of a turbine,
a number of times that a time derivative value of the number of rotations of the turbine has exceeded a fifth predetermined value,
a number of times that the time derivative value of the number of rotations of the turbine has fallen below the fifth predetermined value,
a time integral value of the number of rotations of the turbine,
a number of rotations of a propeller,
a number of times that a time derivative value of the number of rotations of the propeller has exceeded a sixth predetermined value,
a number of times that the time derivative value of the number of rotations of the propeller has fallen below the sixth predetermined value,
a time integral value of the number of rotations of the propeller,
a number of times that a coolant temperature or an oil temperature of an engine of the vehicle has exceeded a predetermined temperature,
a number of times that the coolant temperature or the oil temperature of the engine of the vehicle has fallen below the predetermined temperature,
a time integral value of the coolant temperature or the oil temperature of the engine of the vehicle,
a battery current,
a time integral value of the battery current,
a number of times that a time derivative value of the battery current has exceeded a seventh predetermined value,
a number of times that the time derivative value of the battery current has fallen below the seventh predetermined value,
a battery voltage,
a number of times that a time derivative value of a value obtained by dividing the battery current by the battery voltage has exceeded an eighth predetermined value, and
a number of times that the time derivative value of the value obtained by dividing the battery current by the battery voltage has fallen below the eighth predetermined value.

17. The indicator data output method according to claim 14, wherein
the indicator data storage unit stores the vehicle identification data, the indicator data, and the vehicle usage amount data in association with each other,
in the vehicle usage amount data-obtaining step, latest vehicle usage amount data is obtained as the vehicle usage amount data,
in the indicator data-updating step, vehicle usage amount differential data is calculated by subtracting the vehicle usage amount data stored in the indicator data storage unit from the latest vehicle usage amount data obtained in the vehicle usage amount data-obtaining step, and
in the indicator data-updating step, the indicator differential data is obtained based on the vehicle usage amount differential data.

18. The indicator data output method according to claim 17, wherein
the vehicle usage amount data stored in the indicator data storage unit is vehicle usage amount data upon most recent maintenance of the vehicle.

19. The indicator data output method according to claim 18, wherein
in a case where the vehicle usage amount differential data is higher than a vehicle usage amount differential data upper limit value, the vehicle usage amount differential data is updated using the vehicle usage amount differential data upper limit value in the indicator data-updating step.

20. The indicator data output method according to claim 14, wherein
the indicator data stored in the indicator data storage unit is indicator data upon most recent maintenance of the vehicle.

21. The indicator data output method according to claim 20, wherein
   in a case where the indicator differential data is higher than an indicator differential data upper limit value, the indicator differential data is updated using the indicator differential data upper limit value in the indicator data-updating step.

22. The indicator data output method according to claim 17, wherein
   the vehicle usage amount differential data is obtained in the indicator data-updating step, the vehicle usage amount differential data increasing over a vehicle usage amount differential data effective period.

23. The indicator data output method according to claim 14, wherein
   the indicator differential data is obtained in the indicator data-updating step, the indicator differential data increasing over an indicator differential data effective period.

24. The indicator data output method according to claim 14, wherein
   in the indicator data-updating step, the indicator data stored in the indicator data storage unit is updated at a time when a user of the vehicle comes to a shop engaged in maintenance of the vehicle.

25. The indicator data output method according to claim 14, wherein
   in the indicator data-updating step, the indicator data is devalued when an indicator data effective period has elapsed after updating of the indicator data.

26. The indicator data output method according to claim 14, wherein
   in the vehicle usage amount data-obtaining step, the vehicle identification data and the vehicle usage amount data are obtained by radio communication, the vehicle usage amount data indicating the usage amount of the vehicle, the vehicle being identified by the vehicle identification data.

\* \* \* \* \*